United States Patent
Kubota

(10) Patent No.: US 8,472,671 B2
(45) Date of Patent: Jun. 25, 2013

(54) TRACKING APPARATUS, TRACKING METHOD, AND COMPUTER-READABLE STORAGE MEDIUM

(75) Inventor: Akira Kubota, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 13/182,813

(22) Filed: Jul. 14, 2011

(65) Prior Publication Data

US 2012/0045094 A1 Feb. 23, 2012

(30) Foreign Application Priority Data

Aug. 18, 2010 (JP) ................................ 2010-183481

(51) Int. Cl.
*G06K 9/00* (2006.01)

(52) U.S. Cl.
USPC .......................................... 382/103; 382/162

(58) Field of Classification Search
USPC ............................ 382/103, 162–167, 181–231
See application file for complete search history.

(56) References Cited

U.S. PATENT DOCUMENTS

| 5,748,776 | A | * | 5/1998 | Yoshida | ......................... | 382/195 |
| 6,711,287 | B1 | * | 3/2004 | Iwasaki | ......................... | 382/165 |

FOREIGN PATENT DOCUMENTS

| JP | 05-284411 | 10/1993 |
| JP | 2010-028608 | 2/2010 |

* cited by examiner

*Primary Examiner* — Alex Liew

(74) *Attorney, Agent, or Firm* — Cowan, Liebowitz & Latman, P.C.

(57) ABSTRACT

The present invention provides a tracking apparatus for tracking a target designated on an image which is captured by an image sensing element, including a calculation unit configured to calculate, for each of feature candidate colors, a first area of a pixel group which includes a pixel of a feature candidate color of interest and in which pixels of colors similar to the feature candidate color of interest continuously appear, a second area of pixels of colors similar to the feature candidate color of interest in the plurality of pixels, and a ratio of the first area to the second area, and an extraction unit configured to extract a feature candidate color having the smallest first area as a feature color of the target from feature candidate colors for each of which the ratio of the first area to the second area is higher than a predetermined reference ratio.

19 Claims, 37 Drawing Sheets

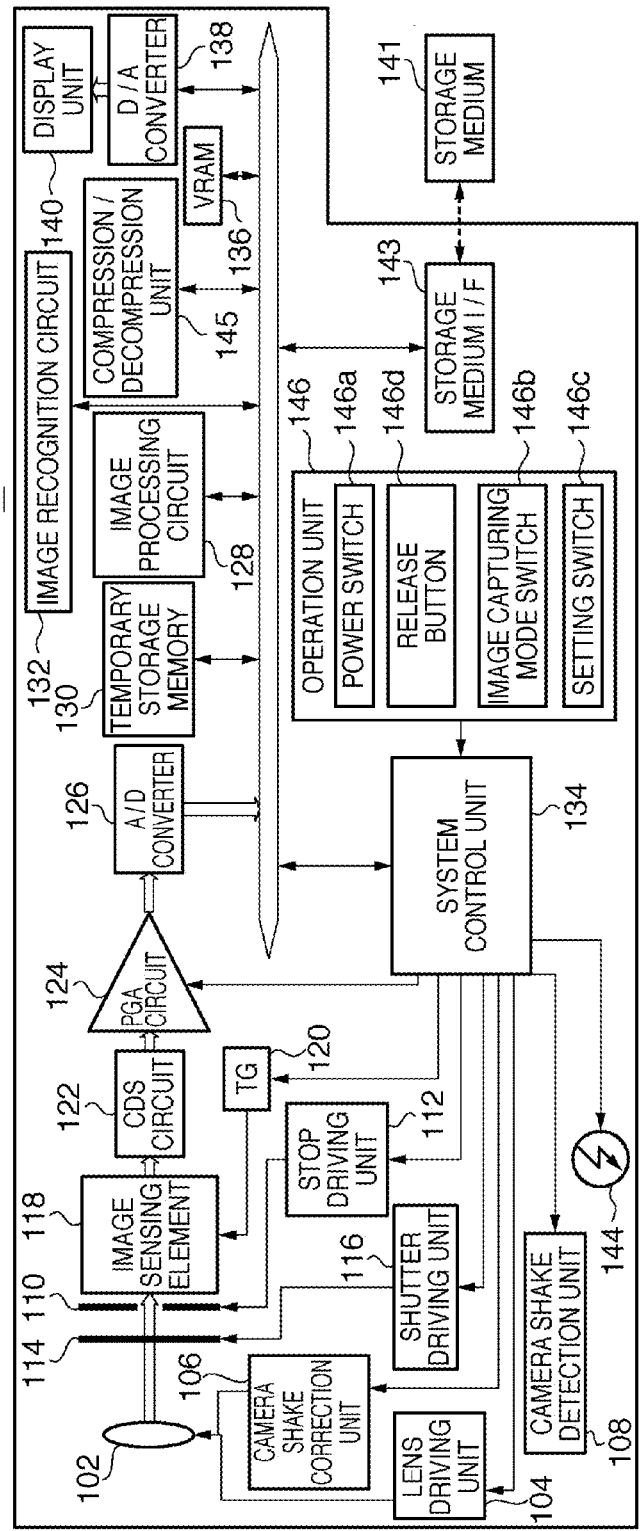
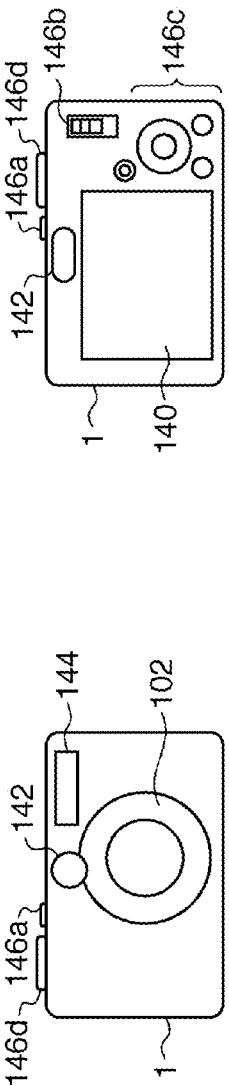
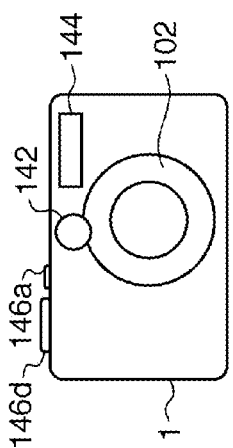

FIG. 4

|  |  | RGB SIGNAL (8bit) | | |
|---|---|---|---|---|
|  |  | R | G | B |
| FEATURE CANDIDATE COLOR (PIXEL) | A | 174 | 138 | 18 |
|  | B | 234 | 216 | 80 |
|  | C | 225 | 208 | 33 |
|  | D | 175 | 131 | 22 |
|  | E | 200 | 159 | 15 |
|  | F | 188 | 146 | 2 |
|  | G | 157 | 117 | 45 |
|  | H | 174 | 123 | 14 |
|  | I | 163 | 111 | 9 |

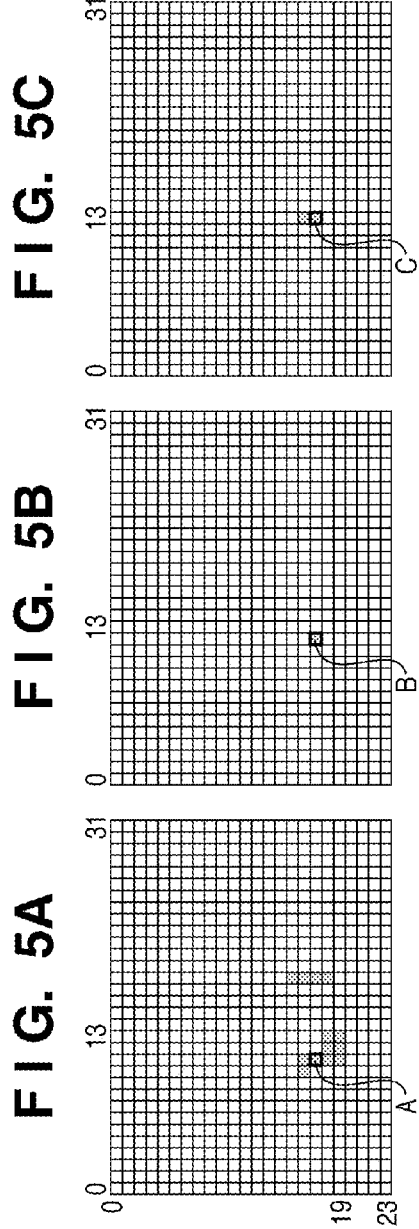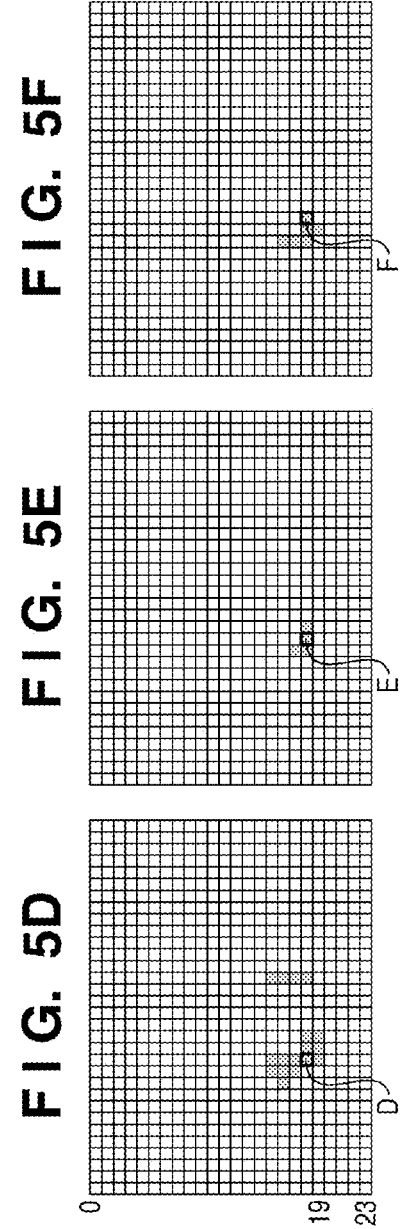

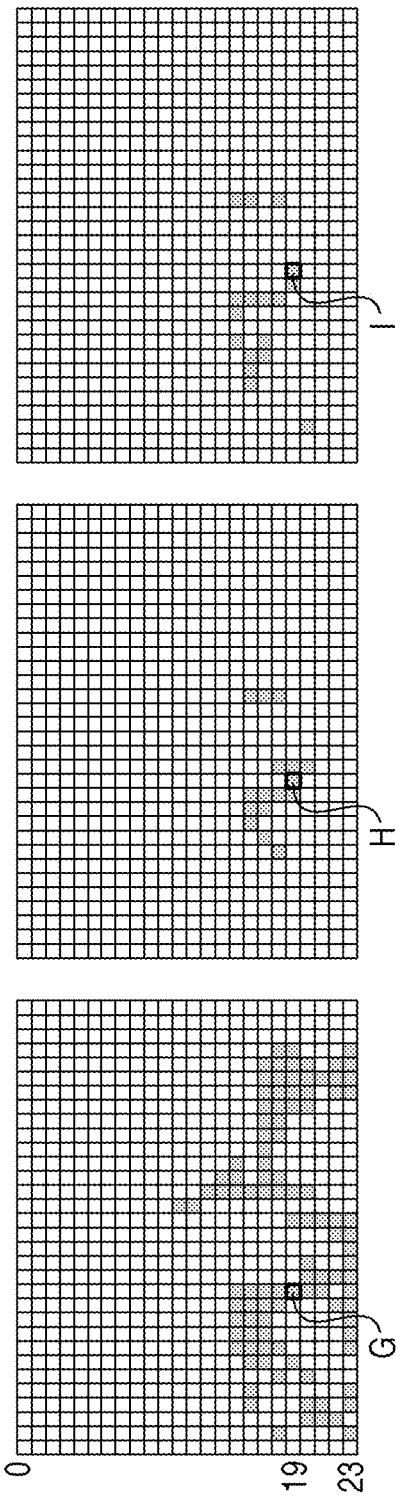

| | | PARTIAL REGION | | | | | | Sum |
|---|---|---|---|---|---|---|---|---|
| | | FIRST PARTIAL REGION | SECOND PARTIAL REGION | THIRD PARTIAL REGION | FOURTH PARTIAL REGION | FIFTH PARTIAL REGION | SIXTH PARTIAL REGION | SURROUNDING REGION | |
| FEATURE CANDI-DATE COLOR (PIXEL) | A | 5 | 3 | 1 | 0 | 0 | 0 | 3 | 12 |
| | B | 1 | 0 | 0 | 0 | 0 | 0 | 0 | 1 |
| | C | 2 | 0 | 0 | 0 | 0 | 0 | 0 | 2 |
| | D | 6 | 4 | 3 | 0 | 0 | 0 | 3 | 16 |
| | E | 4 | 0 | 0 | 0 | 0 | 0 | 0 | 4 |
| | F | 3 | 2 | 1 | 0 | 0 | 0 | 0 | 6 |
| | G | 5 | 5 | 5 | 13 | 10 | 8 | 59 | 105 |
| | H | 4 | 1 | 1 | 3 | 3 | 3 | 0 | 15 |
| | I | 2 | 1 | 1 | 2 | 4 | 5 | 3 | 18 |

FIG. 8

| | | Area1 | BORDER CONDITION [NUMBER OF PIXELS] |
|---|---|---|---|
| FEATURE CANDIDATE COLOR (PIXEL) | A | 5 | 5 × 0.25 = 1.25 |
| | B | 1 | 1 × 0.25 = 0.25 |
| | C | 2 | 2 × 0.25 = 0.50 |
| | D | 6 | 6 × 0.25 = 1.50 |
| | E | 4 | 4 × 0.25 = 1.00 |
| | F | 3 | 3 × 0.25 = 0.75 |
| | G | 5 | 5 × 0.25 = 1.25 |
| | H | 4 | 4 × 0.25 = 1.00 |
| | I | 2 | 2 × 0.25 = 0.50 |

F I G. 10

| | | AreaIn | Sum | INTRA-BORDER COLOR RATIO AreaIn / Sum * 100 [%] |
|---|---|---|---|---|
| FEATURE CANDIDATE COLOR (PIXEL) | A | 8 | 12 | 8 / 12 * 100 = 67% |
| | B | 1 | 1 | 1 / 1 * 100 = 100% |
| | C | 2 | 2 | 2 / 2 * 100 = 100% |
| | D | 13 | 16 | 13 / 16 * 100 = 82% |
| | E | 4 | 4 | 4 / 4 * 100 = 100% |
| | F | 5 | 6 | 5 / 6 * 100 = 83% |
| | G | - | - | - |
| | H | 4 | 15 | 4 / 15 * 100 = 27% |
| | I | 2 | 18 | 2 / 18 * 100 = 11% |

FIG. 11A

| FEATURE CANDIDATE COLOR (PIXEL) | AreaIn | INTRA-BORDER COLOR RATIO |
|---|---|---|
| E | 4 | 100% |
| C | 2 | 100% |
| B | 1 | 100% |
| F | 5 | 83% |
| D | 13 | 82% |
| A | 8 | 67% |
| H | 4 | 27% |
| I | 2 | 11% |
| G (EXCLUSION) | - | - |

FIG. 11B

| FEATURE CANDIDATE COLOR (PIXEL) | AreaIn | INTRA-BORDER COLOR RATIO | REFERENCE RATIO |
|---|---|---|---|
| E | 4 | 100% | 0% |
| C | 2 | 100% | 10% |
| B | 1 | 100% | 20% |
| F | 5 | 83% | 30% |
| D | 13 | 82% | 40% |
| A | 8 | 67% | 50% |
| H | 4 | 27% | 60% |
| I | 2 | 11% | 70% |
| G (EXCLUSION) | - | - | 80% |

FIG. 12A

| FEATURE CANDIDATE COLOR (PIXEL) | AreaIn | FEATURE DEGREE AreaInMin / AreaInX * 100 [%] |
|---|---|---|
| B | 1 | 1/1 * 100 = 100% |
| C | 2 | 1/2 * 100 = 50% |
| E | 4 | 1/4 * 100 = 25% |
| F | 5 | 1/5 * 100 = 20% |
| A | 8 | 1/8 * 100 = 12% |
| D | 13 | 1/13 * 100 = 7% |
| H | - | - |
| I | - | - |
| G | - | - |
| (EXCLUSION) | | |

FIG. 12B

| FEATURE CANDIDATE COLOR (PIXEL) | AreaIn | FEATURE DEGREE | REFERENCE FEATURE DEGREE |
|---|---|---|---|
| B | 1 | 100% | 0 |
| C | 2 | 50% | 0 |
| E | 4 | 25% | 15 |
| F | 5 | 20% | 30 |
| A | 8 | 12% | 45 |
| D | 13 | 7% | 60 |
| H | - | - | 75 |
| I | - | - | 90 |
| G | - | - | 90 |
| (EXCLUSION) | | | |

| | | MAIN PIXEL | | | | SUB PIXEL | | | | | | | | | | | | |
|---|---|---|---|---|---|---|---|---|---|---|---|---|---|---|---|---|---|---|
| | | RGB SIGNAL(8bit) | | | | UPPER RGB SIGNAL(8bit) | | | | LOWER RGB SIGNAL(8bit) | | | | LEFT RGB SIGNAL (8bit) | | | RIGHT RGB SIGNAL (8bit) | |
| | FEATURE DEGREE | R | G | B | | R | G | B | | R | G | B | | R | G | B | R | G | B |
| STATIC FEATURE COLOR | B 100 | 234 | 216 | 80 | | 212 | 177 | 51 | | 200 | 159 | 15 | | 174 | 138 | 18 | 225 | 208 | 33 |
| | C 50 | 225 | 208 | 33 | | 212 | 182 | 48 | | 188 | 146 | 2 | | 234 | 216 | 80 | 112 | 91 | 0 |
| | E 25 | 200 | 159 | 15 | | 234 | 216 | 80 | | 174 | 123 | 14 | | 175 | 131 | 22 | 188 | 146 | 2 |
| DYNAMIC FEATURE COLOR | * 100 | 234 | 216 | 80 | | 212 | 177 | 51 | | 200 | 159 | 15 | | 174 | 138 | 18 | 225 | 208 | 33 |

F I G. 17A
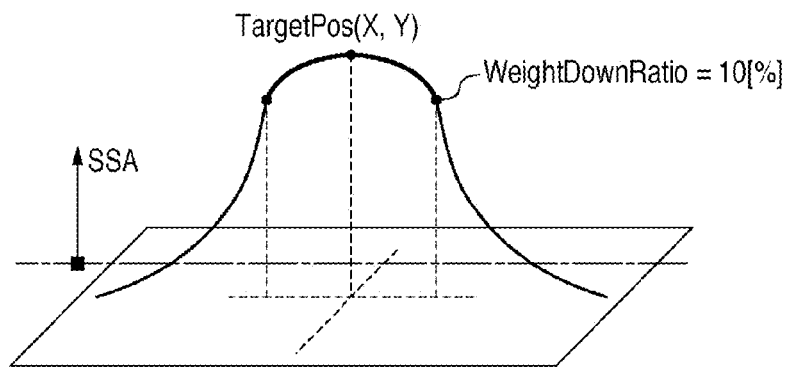
F I G. 17B
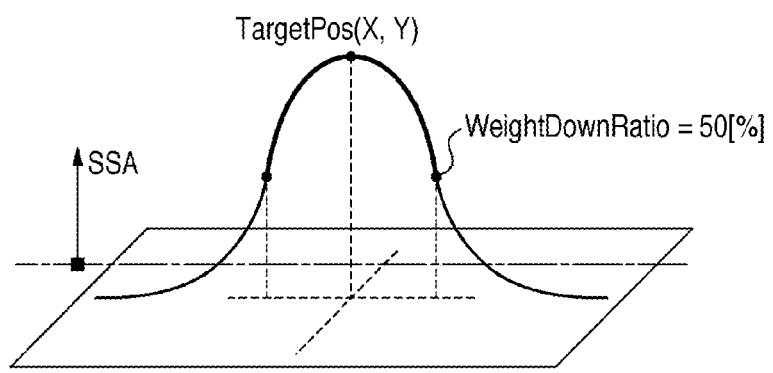
F I G. 17C
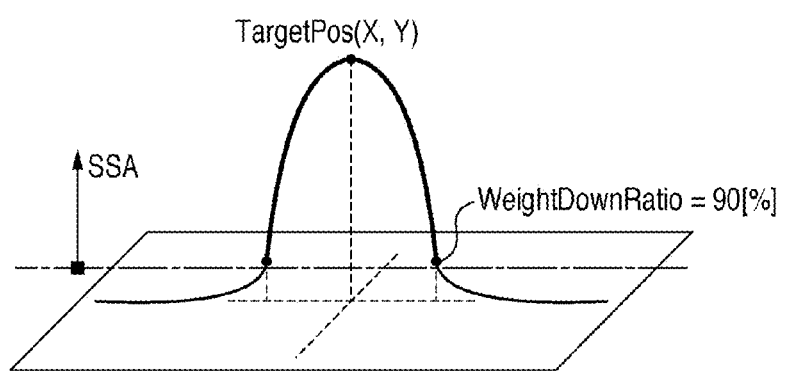

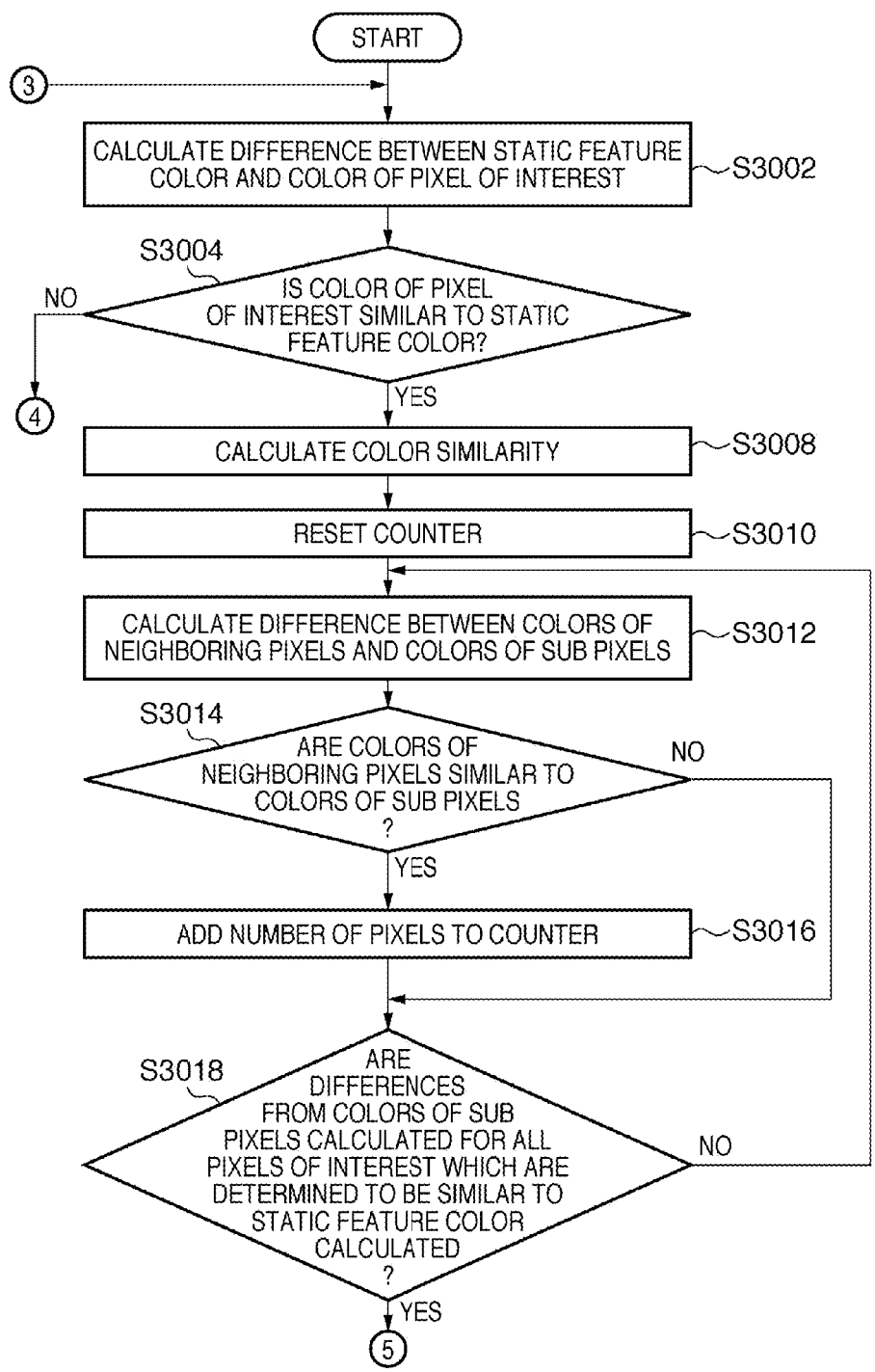

FIG. 32A  FIG. 32B
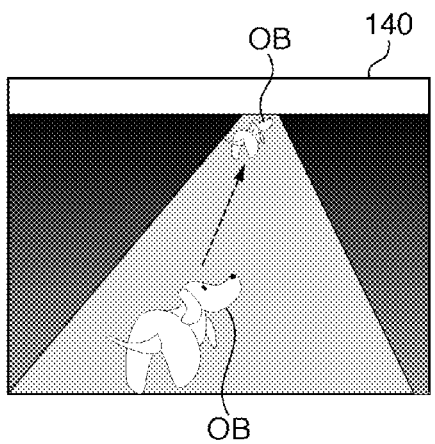
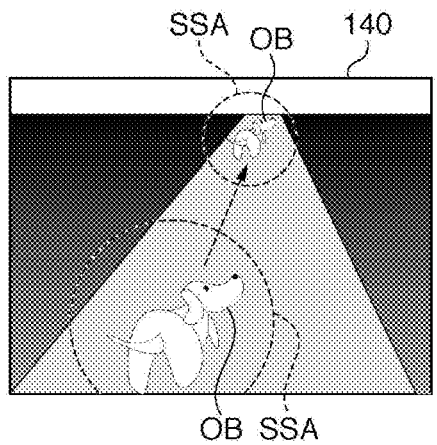
FIG. 33
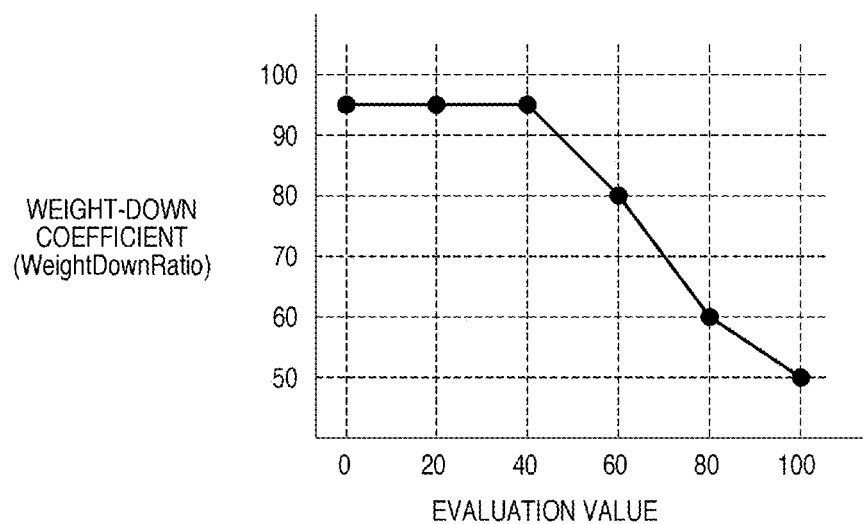

TRACKING APPARATUS, TRACKING METHOD, AND COMPUTER-READABLE STORAGE MEDIUM

BACKGROUND OF THE INVENTION

1. Field of the Invention

The present invention relates to a tracking apparatus for tracking a target object, a tracking method, and a computer-readable storage medium.

2. Description of the Related Art

An image capturing apparatus (for example, a digital camera) which captures a still image and moving image includes a tracking function of tracking (searching) an arbitrary target object. Such a tracking function is implemented using, for example, a pattern matching method, a relative difference method, or a color/luminance matching method. The pattern matching method searches an image to be captured for, as a target object, a region having a high matching degree with a template image stored in a storage unit or that which is updated as needed in a tracking mode. The relative difference method searches for a target object from an image difference between the current and previous frames. The color/luminance matching method searches an image to be captured for, as a target object, a region having a high matching degree with one or a plurality of colors, luminance levels, or histograms extracted from a target object.

The pattern matching method can attain a high-precision tracking performance when a target object does not move. However, the pattern matching method cannot attain a sufficient tracking performance when a target object moves (a change in distance between the target object and image capturing apparatus, a rotation of the target object, a change in orientation of the image capturing apparatus, etc.) The relative difference method fails to track a target object when another object passes between the target object and image capturing apparatus or when the target object frames in after it completely frames out. The color/luminance matching method can support a motion of a target object to some extent. However, the color/luminance matching method is not precise in specifying a target object based only on colors and luminance levels of the target object, and cannot attain sufficient tracking performance when a background includes many colors and luminance levels similar to those of the target object.

To solve such problems, Japanese Patent Laid-Open Nos. 5-284411 and 2010-28608 have proposed techniques to enhance tracking performance. Japanese Patent Laid-Open Nos. 5-284411 and 2010-28608 disclose techniques associated with extraction of features of a target object. With the technique of Japanese Patent Laid-Open No. 5-284411, a color (color signal) which most frequently appears in a region including a target object to be tracked is selected as a feature color of the target object. With the technique of Japanese Patent Laid-Open No. 2010-28608, upon extraction of a color of a target object to be tracked, a color which most frequently appears in a region including the target object and does not frequently appear in a background is preferentially selected as a feature color of the target object.

However, when the color which most frequently appears in the region including the target object is selected as the feature color, a background color included in that region is likely to be selected as the feature color, and an object which is different from the user's intention may be tracked (that is, a tracking error may occur). A color with low percentages of appearance in the region including the target object is likely to be an important color which represents a feature of the target object, but it is not selected as the feature color and is excluded. However, when the color with the low percentages of appearance in the region including the target object is simply selected as a feature color, the target object fails to be tracked when the feature color comes and goes due to a change of a surrounding environment or the target object. Also, a tracking error may occur when the same color as the feature color is included in another object other than the target object.

SUMMARY OF THE INVENTION

The present invention provides a technique which is advantageous in a reduction of tracking errors of a target object.

According to one aspect of the present invention, there is provided a tracking apparatus for tracking a target object designated on an image which is captured by an image sensing element having a plurality of pixels, including a setting unit configured to set a pixel region including a pixel corresponding to a position of the designated target object as a feature color extraction region used to extract a feature color of the target object, and to set colors of respective pixels included in the feature color extraction region as feature candidate colors, a calculation unit configured to calculate, for each of the feature candidate colors, a first area of a pixel group which includes a pixel of a feature candidate color of interest and in which pixels of colors similar to the feature candidate color of interest continuously appear, a second area of pixels of colors similar to the feature candidate color of interest in the plurality of pixels, and a ratio of the first area to the second area, an extraction unit configured to extract a feature candidate color having the smallest first area as a feature color of the target object from feature candidate colors for each of which the ratio of the first area to the second area is higher than a predetermined reference ratio, and a decision unit configured to decide, as the target object, a position corresponding to a pixel of a color similar to the feature color extracted by the extraction unit.

Further aspects of the present invention will become apparent from the following description of exemplary embodiments with reference to the attached drawings.

BRIEF DESCRIPTION OF THE DRAWINGS

FIGS. 1A to 1C are views showing an image capturing apparatus which serves as a tracking apparatus according to one aspect of the present invention.

FIG. 4 is a table showing an example of feature candidate colors extracted from the feature color extraction region.

FIGS. 5A to 5I are views showing distributions of pixels of colors respectively similar to the feature candidate colors.

FIG. 6 is a view showing an example in which an image is divided into six partial regions according to distances from a base point.

FIG. 7 is a table showing count results of the numbers of pixels of similar colors to the feature candidate colors included in the partial regions.

FIG. 8 is a table showing border conditions required to detect borders between pixel groups including pixels of similar colors to the feature candidate colors and pixels of other colors.

FIG. 10 is a table showing the numbers of pixels in the pixel groups including pixels of similar colors to the feature candidate colors and the total numbers of pixels of similar colors to the feature candidate colors included in an entire image.

FIGS. 11A and 11B are tables showing the sort result of the feature candidate colors in descending order of intra-border color ratio, and reference ratios respectively set for the feature candidate colors.

FIGS. 12A and 12B are tables showing the sort result of the feature candidate colors in ascending order of the number of pixels in the pixel groups, and reference feature degrees respectively set for the feature candidate colors.

FIGS. 17A to 17C are views showing the concept of the weight table.

FIGS. 30A and 30B are flowcharts for explaining static evaluation value calculation processing in step S2812 shown in FIG. 28.

FIGS. 32A and 32B are views showing an example of a static search region set according to a motion of a target object.

FIG. 33 is a graph showing weight-down coefficients according to evaluation values.

DESCRIPTION OF THE EMBODIMENTS

Figure 2B:
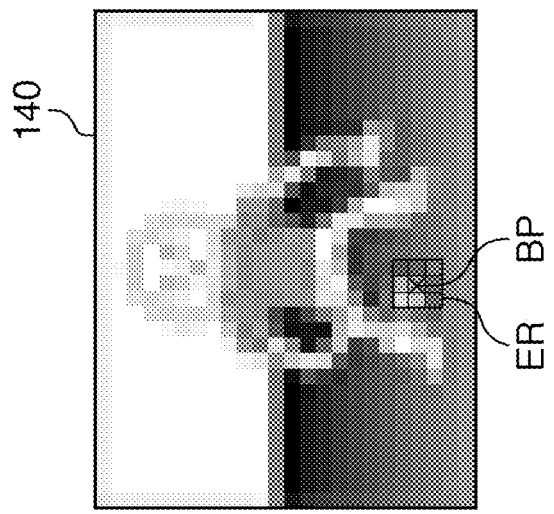
FIGS. 2A and 2B are views showing an example of a scene to be captured.

Preferred embodiments of the present invention will be described below with reference to the accompanying drawings. Note that the same reference numerals denote the same members throughout the drawings, and a repetitive description thereof will not be given.

FIGS. 1A to 1C show an image capturing apparatus 1. FIG. 1A is a schematic block diagram showing the arrangement of the image capturing apparatus 1, FIG. 1B is a front view showing the outer appearance of the image capturing apparatus 1, and FIG. 1C is a rear view showing the outer appearance of the image capturing apparatus 1. The image capturing apparatus 1 is used to capture an image of an object, and is embodied as, for example, a digital camera. In this embodiment, the image capturing apparatus 1 includes a tracking function of tracking a target object designated on an image to be captured (that is, the apparatus serves as a tracking apparatus).

A lens 102 focuses external light (light coming from an object). A lens driving unit 104 drives the lens 102 along an optical axis so as to adjust a focal point and field angle. A camera shake correction unit 106 drives the lens 102 based on camera shake detected by a camera shake detection unit 108 to cancel the camera shake (that is, it realizes optical camera shake correction). The camera shake detection unit 108 includes, for example, a gyro sensor. Note that the camera shake correction is attained by driving the lens 102 in this embodiment. Alternatively, the camera shake correction may be attained by driving an image sensing element 118.

A stop 110 includes an iris stop or circular stop, and adjusts an amount of light which has passed through the lens 102 (light coming from an object). A stop driving unit 112 drives the stop 110 based on control information from a system control unit 134. For example, when the luminance of an object is high, the stop driving unit 112 drives (stops down) the stop 110 to drop the amount of light coming from the object; when the luminance of the object is low, it drives (fully opens) the stop 110 to take in a larger amount of light coming from the object. Note that an ND filter may be removably arranged on the optical path of light coming from an object, and may adjust the amount of light coming from the object in cooperation with the stop 110.

A shutter 114 allows light coming from an object to pass through itself in an open state, and shields the light coming from the object in a close state. A shutter driving unit 116 drives the shutter 114 to the open or close state based on control information from the system control unit 134. An exposure time upon capturing an image (still image) is specified by an open/close time of the shutter 114.

The image sensing element 118 has a plurality of pixels, and is configured by, for example, a CCD image sensor or CMOS image sensor. The image sensing element 118 converts an optical image formed via the lens 102, shutter 114, and stop 110 into an electrical signal. The image sensing element 118 is controlled by the system control unit 134 via a timing generator (TG) 120. The image sensing element 118 periodically executes a charging operation of electric charges (exposure) and a reading operation of the charged electric charges (reading of an image signal) with reference to driving signals generated by the TG 120 based on control information from the system control unit 134. Also, electric charges of a specific line or region of those charged by the image sensing element 118 can be read. For example, since a high resolution is required upon capturing a still image, all electric charges charged by the image sensing element 118 are read. On the other hand, since a frame rate as high as 30 fps or 60 fps is required upon capturing a moving image or enabling an electronic viewfinder, electric charges are read by decimating specific lines of electric charges charged by the image sensing element 118. Note that the TG 120 generates driving signals used to read electric charges charged by the image sensing element 118 at arbitrary timings, thus also controlling an exposure time.

A CDS (Correlated Double Sampler) circuit 122 removes noise components from an image signal read from the image sensing element 118 using a CDS method. A PGA (Programmable Gain Amplifier) circuit 124 attenuates or amplifies a level of image data based on control information from the system control unit 134. Normally, an amount of light is appropriately set by the stop 110, and an exposure time is appropriately set by the shutter 114, thus appropriately setting an exposure value of the image sensing element 118. In this case, when the PGA circuit 124 attenuates or amplifies image data, an exposure value can be changed in a pseudo manner. This is provided to the user as a sensitivity as one of exposure conditions at the time of image capturing.

An A/D converter 126 converts an analog image signal (analog image data) output from the image sensing element 118 into a digital image signal (digital image data). Since bit widths of digital signals include 10 bits, 12 bits, and 14 bits, an image processing circuit 128 is configured to support a plurality of different bit widths. The image processing circuit 128 applies various kinds of image processing to an image signal from the A/D converter 126. In this embodiment, the TG 120, CDS circuit 122, PGA circuit 124, and A/D converter 126 are configured by independent blocks, but they may be configured by a single block including their functions.

In general, color filters are arranged on the image sensing element 118, and specific color components are extracted for respective pixels via the color filters. Since an image signal from the A/D converter 126 has a format corresponding to the layout of the pixels and color filters of the image sensing element 118, it is not suited to use in AE (Auto Exposure Control) processing which attains exposure control by evaluating only luminance components. The image processing circuit 128 has a function of extracting only luminance information by excluding color information from the image signal, and can convert the image signal from the A/D converter 126 into a format suited to use in AE. The image processing circuit 128 also has a function of extracting only color information by excluding luminance information from the image signal, and can convert the image signal into a format suited to use in AWB (Auto White Balance) processing that specifies a light source color of an object and appropriately adjusts the color.

Furthermore, the image processing circuit 128 has a function of extracting only frequency components of an image signal read from the image sensing element 118, and can convert the image signal into a format suited to use in AF (Auto Focus) processing. The image processing circuit 128 includes a function that allows to set a region from which frequency components are to be extracted, and how to divide the region in an image signal read from the image sensing element 118. In the AF processing, the image sensing element 118 is driven in a driving mode suited to distance measurement. In the AF processing using the image sensing element 118, since a focus lens is required to be driven in synchronism with a driving rate (frame rate) of the image sensing element 118, the driving speed of the focus lens can be set to be high when the driving rate of the image sensing element 118 is high. Therefore, when the AF processing is done within a short period of time, the image sensing element 118 can be driven to increase the driving rate. On the other hand, by setting a low driving rate to read many image signal components from the image sensing element 118, the number of frequency components that can be analyzed by the image processing circuit 128 can be increased, thus allowing to measure a distance more precisely.

The image processing circuit 128 has, for example, a function of increasing/decreasing a level of an image signal from the A/D converter 126, and a function of operating a color effect and the like of an image, thus adjusting image quality of an image to be captured. The function of increasing/decreasing the level of an image signal includes, for example, a function of increasing/decreasing the level of an entire image at a unique rate, a tone curve (gamma) function of converting the level in accordance with that of an original image signal, and a function of increasing/decreasing the level at a ratio according to frequency components for respective regions of an image.

A temporary storage memory 130 stores an image signal from the A/D converter 126 (that is, an image signal input to the image processing circuit 128). The image signal stored in the temporary storage memory 130 can be read out again. For example, the system control unit 134 can refer to the image signal stored in the temporary storage memory 130, and can input the readout image signal to the image processing circuit 128. Also, the temporary storage memory 130 can store an image signal which has undergone the image processing in the image processing circuit 128 and that output from the system control unit 134.

An image recognition circuit 132 recognizes, for example, a brightness state, in-focus state, and color state of an image signal (image) which has undergone the image processing in the image processing circuit 128. When an image includes a person, the image recognition circuit 132 can also recognize a face and facial expression of that person. When an image includes text, the image recognition circuit 132 can also recognize that text information. To the image recognition circuit 132, a plurality of image signals can be input. For example, the image recognition circuit 132 compares two input image signals (that is, it compares features of images) to determine whether or not the two image signals are the same. Note that the aforementioned image recognition processing is also implemented by the system control unit 134. For example, the system control unit 134 reads out an image signal stored in the temporary storage memory 130, and analyzes that image signal to recognize a state of a scene.

The system control unit 134 includes, for example, a CPU and memory, and controls the overall operations of the image capturing apparatus 1. The system control unit 134 executes respective processes of this embodiment by executing programs stored in the memory.

On a VRAM 136, an image signal which has undergone the image processing in the image processing circuit 128 is expanded. A D/A converter 138 converts a digital image signal expanded on the VRAM 136 into an analog image signal. A display unit 140 includes, for example, an LCD (Liquid Crystal Display), and displays an image corresponding to an image signal from the D/A converter 138. The display unit 140 can function as an electronic viewfinder by sequentially displaying images corresponding to image signals read from the image sensing element 118. Note that on the VRAM 136, an image signal is expanded in correspondence with various display modes (to display an image corresponding to one image signal or to multi-display a plurality of images corresponding to a plurality of image signals) on the display unit 140.

The display unit 140 displays an image corresponding to image data stored in a storage medium 141 via a storage medium interface (I/F) 143. Note that when image data stored in the storage medium 141 is compressed, that image data can be decompressed by a compression/decompression unit 145, and can be expanded on the VRAM 136. The storage medium 141 is configured by, for example, a nonvolatile memory, and mainly stores image data (captured images). In association with storage of image data, folder layers can be formed, and folder names and file names can be assigned in the image capturing order. Also, an aperture value, shutter speed, sensitivity, and image capturing time, and the like can be appended to each image data. The image capturing apparatus 1 can copy, move, and erase image data stored in the storage medium 141.

The display unit 140 can display not only an image but also arbitrary information solely or together with an image. The arbitrary information includes, for example, a state of the image capturing apparatus 1, text information (a shutter speed, aperture value, sensitivity, etc.), a graph such as a luminance distribution, a face recognition result, and a scene recognition result.

The display unit 140 is arranged on the back surface of the image capturing apparatus 1 (see FIG. 1C). As described above, the display unit 140 can display an image, arbitrary information, and the like, and serves as a user interface. When the display unit 140 functions as an electronic viewfinder, photometry region information and measured distance information in the AE processing and AF processing can be superimposed on a live image. Also, the display unit 140 can superimpose a frame on a human face as a face recognition result or can display an icon indicating a scene such as blue sky, sunset, and backlight as a scene recognition result.

Note that the image capturing apparatus 1 can also include an optical viewfinder 142 in addition to the electronic viewfinder by means of the display unit 140. The electronic viewfinder has advantages of attaining a high visual field ratio, allowing the user to easily view a large object image, and providing no field angle difference (parallax) between an image to be captured and a finder image, but it requires an electric power (consumes an electric power) to drive the image sensing element 118 and display unit 140. Therefore, when the user wants to capture many images while avoiding consumption of a battery, he or she preferably uses the optical viewfinder 142 without enabling the electronic viewfinder.

A strobe unit 144 is arranged on, for example, the front surface of the image capturing apparatus 1 to be flush with the lens 102 (see FIG. 1B). When an object is dark, the strobe unit 144 irradiates the object with strobe light, thus obtaining a sufficient amount of light. Hence, a preferred image can be captured while maintaining a high shutter speed. Note that in order to avoid an object from being directly irradiated with strobe light, the strobe unit 144 may be arranged to emit the strobe light in an upper portion direction of the image capturing apparatus 1.

An operation unit 146 has a function of accepting user operations (to input various instructions to the system control unit 134), and includes, for example, a power switch 146a, mode switch 146b, setting switch 146c, and release button 146d. When the display unit 140 includes a touch panel, it can serve as a part of the operation unit 146.

The power switch 146a is used to switch a power supply state of the image capturing apparatus 1 between power-ON and power-OFF states. The mode switch 146b is used to switch an operation mode (still image capturing mode, moving image capturing mode, play mode, etc.) of the image capturing apparatus 1. Also, the mode switch 146b can serve as a switch used to select a mode (for example, a landscape mode, portrait mode, etc.) optimal to a specific scene in the still image capturing mode. The setting switch 146c is used to set image capturing conditions at the time of image capturing such as a distance measurement region and photometry mode, operations such as a page feed operation at the time of image playback, parameters associated with operations of the image capturing apparatus 1, and information about whether or not to enable the electronic viewfinder.

The release button 146d is used to instruct to capture an image of an object, and includes a first switch and second switch. The first switch is turned on in the middle of an operation (half-stroke position) of the release button 146d to start image capturing preparation processing such as the AE processing and AF processing. The second switch is turned on upon completion of an operation (full-stroke position) of the release button 146d to start image capturing processing such as exposure processing and image recognition processing.

A tracking function, which is included in the image capturing apparatus 1 to capture an image of a principal object under suitable conditions (a focus and brightness), will be described below. Note that this tracking function is implemented when the system control unit 134 systematically controls the respective units of the image capturing apparatus 1.

Figure 2A:
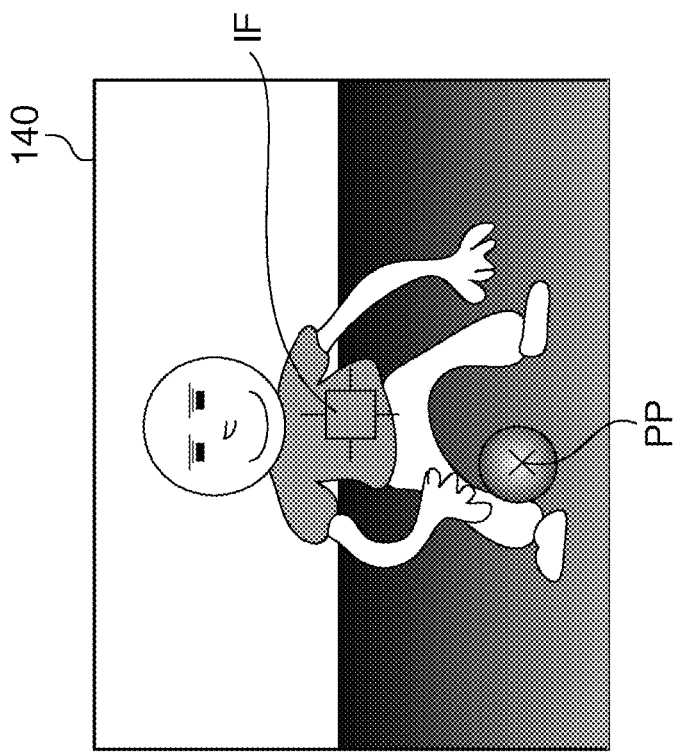

FIGS. 2A and 2B show an example of a scene to be captured. FIG. 2A shows a scene in which a person is located at the center of the display unit 140 (screen) and is playing with a ball. In the scene shown in FIG. 2A, in order to capture an image to have a suited focus and brightness of the principal object, for example, a distance measurement region and photometry region are set near a face of the person according to a position and size of the face based on the face recognition result of the face recognition function. Then, the AF processing and AE processing can be executed using distance measurement information and photometry information obtained from such settings. Note that when no face recognition function is available, a plurality of distance measurement regions are set, and pieces of distance measurement information obtained from the plurality of distance measurement regions are comprehensively analyzed. Then, for example, AF control can be executed in preference to a near distance side based on the analysis result.

When a specific target object (or a portion of a target object) is kept set in an in-focus state, the designated target object is required to be tracked (that is, the tracking function). In FIG. 2A, a tracking target designation frame IF used to designate a target object to be tracked is displayed at the center of the display unit 140. For example, when the user presses the setting switch 146c at an arbitrary timing in this state, the image capturing apparatus 1 determines that the target object to be tracked is designated, and sets an object located inside or near the tracking target designation frame IF as the target object to be tracked. When the display unit 140 includes a touch panel, and the user presses a desired position of the display unit 140, the image capturing apparatus 1 determines that the target object to be tracked is designated, and sets an object located near a pressed position PP as the target object to be tracked. In this case, the need for displaying the tracking target designation frame IF or aligning the tracking target designation frame IF with the target object to be tracked can be obviated.

FIG. 2B shows a state in which the image (an image signal corresponding to that image) shown in FIG. 2A undergoes image processing, and is equally divided into blocks. In this embodiment, the target object is tracked using a low-resolution image, which is divided into blocks, as shown in FIG. 2B.

Figure 3:
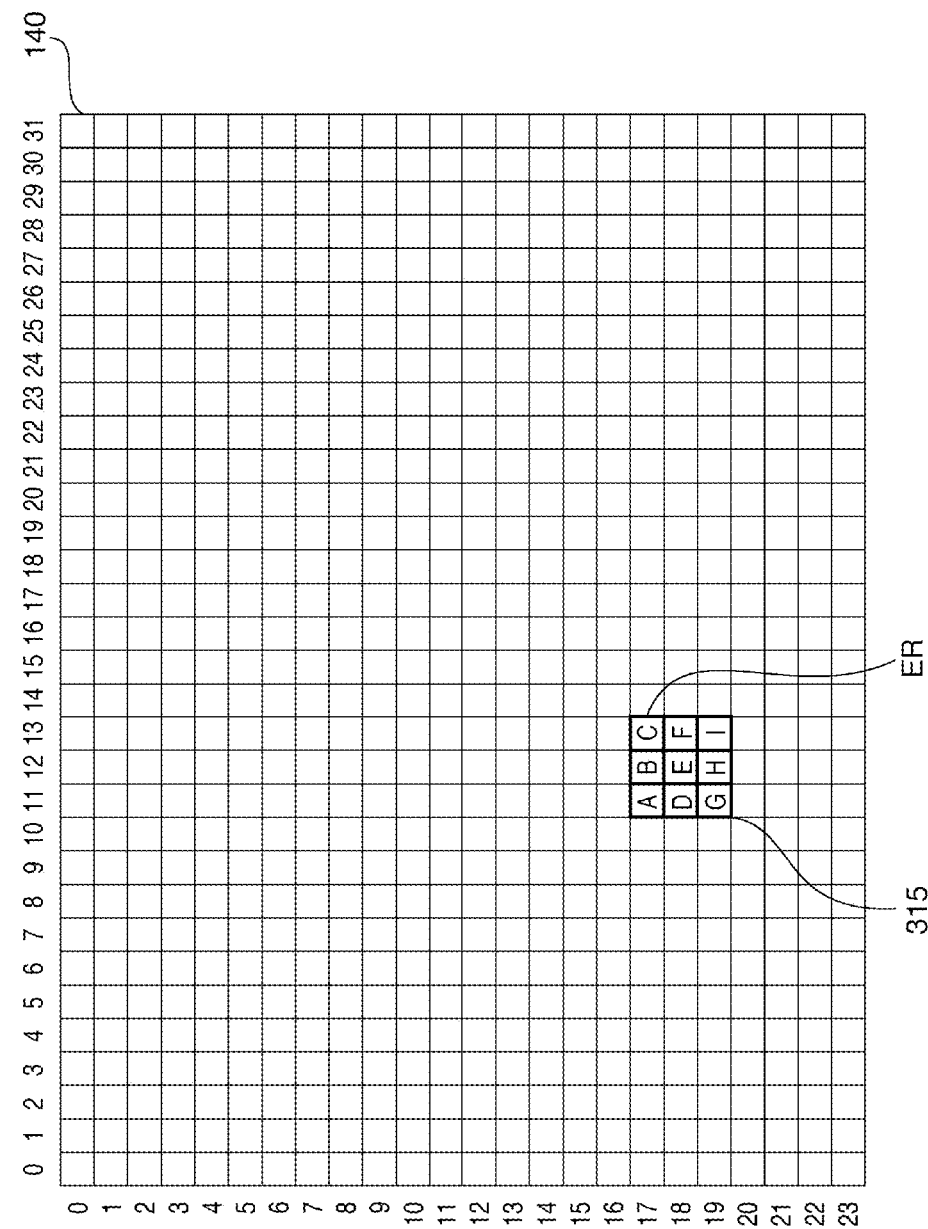
FIG. 3 is a view showing a setting example of a feature color extraction region used to extract a feature color of a target object.

As shown in FIG. 2B, assume that a ball is designated as a target object to be tracked, and a pixel region including a pixel corresponding to a ball position BP is set as a feature color extraction region ER required to extract feature colors of the target object. In this embodiment, the pixel region including the pixel corresponding to the ball position BP and eight pixels located around that pixel is set as the feature color extraction region ER. More specifically, as shown in FIG. 3, an image displayed on the display unit 140 is divided into 32×24 blocks, and a pixel region including a pixel E corresponding to the ball position BP and eight pixels A, B, C, D, F, G, H, and I located around the pixel E is set as the feature color extraction region ER.

Next, as shown in FIG. 4, respective colors of the nine pixels A to I included in the feature color extraction region ER are extracted (set) as feature candidate colors A to I. In this embodiment, assume that signal components of the nine pixels A to I are expressed using an RGB format (8 bits).

How pixels of colors similar to the feature candidate colors (that is, pixels of similar colors) are distributed in the image is calculated. In this case, when differences between R, G, and B components of each feature candidate color and those of a pixel of interest fall within a range of a predetermined signal level ThRGB, it is judged that the color of the pixel of interest is similar to the feature candidate color, as given by:

$$\Sigma abs(R(n)-R(x,y)) \leq ThRGB$$

$$\Sigma abs(G(n)-G(x,y)) \leq ThRGB$$

$$\Sigma abs(B(n)-B(x,y)) \leq ThRGB \quad (1)$$

where ThRGB: 30LSB, n: a feature candidate color (feature candidate colors A to I), x: a horizontal coordinate (0 to 31), and y: a vertical coordinate (0 to 23).

Note that in this embodiment, signal components of each pixel are expressed using the RGB format, and whether or not three elements (R, G, and B) fall within the predetermined range is used as criteria for similarity judgment. However, to color similarity judgment, various techniques which are known to those who are skilled in the art can be applied. For example, signal components of a pixel may be separated into a luminance component and color components (that is, the signal components may be expressed using a YCrCb format), a pixel having a saturation equal to or higher than a threshold may undergo color similarity judgment using hue information, and a pixel having a saturation less than the threshold may undergo color similarity judgment using luminance information.

FIGS. 5A to 5I are views showing distributions of pixels of similar colors to the feature candidate colors A to I (colors of the pixels A to I), respectively. In FIGS. 5A to 5I, pixels of similar colors to the feature candidate colors A to I are indicated by gray pixels. Referring to FIGS. 5A to 5I, since pixels of similar colors to the feature candidate colors (that is, the colors of the pixels B, C, and E are not distributed around the pixels B, C, and E, the colors of the pixels B, C, and E are more likely to be feature colors of the ball as the target object. On the other hand, since many pixels of similar colors to the feature candidate color (that is, the color of the pixel G) are distributed around the pixel G, the color of the pixel G is more likely to express, for example, a floor color, and is unlikely to be a feature color of the ball.

Figure 6:
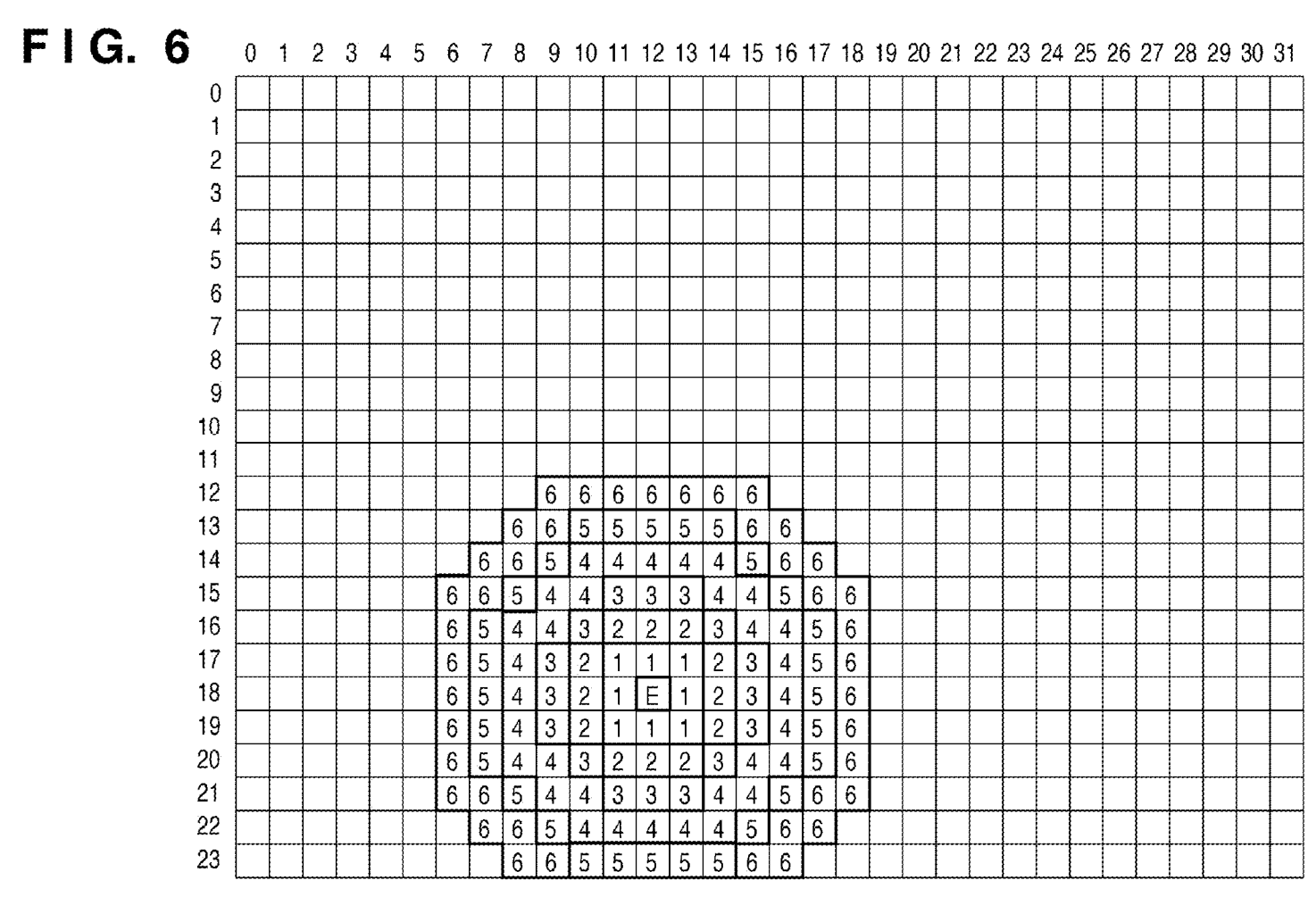

Next, a pixel corresponding to the tracking target designated position (the pixel E in this embodiment) is set as a base point, the image is divided into partial regions according to distances from the base point, and the numbers of pixels of colors similar to the feature candidate colors are counted for respective partial regions. FIG. 6 shows an example when the image is divided into six partial regions according to distances from the pixel E as the base point. In this embodiment, as shown in FIG. 6, from the pixel E as the base point, a region separated by 1 step is set as a first partial region, a region separated by 2 steps is set as a second partial region, and a region separated by 3 steps is set as a third partial region. Likewise, from the pixel E as the base point, a region separated by 4 steps is set as a fourth partial region, a region separated by 5 steps is set as a fifth partial region, and a region separated by 6 steps is set as a sixth partial region. In this embodiment, the image is divided into circular partial regions to have the base point as the center. Alternatively, the image may be divided into rectangular partial regions, or it may be divided into regions separated by distances in increments of two steps from the base point. By the same method, first to sixth partial regions are set for each of the pixels A to I to have each of the pixels A to I as the center.

FIG. 7 shows the count results of the numbers of pixels of similar colors to the feature candidate colors A to I, which are included in the first to sixth partial regions. Note that FIG. 7 also shows the count results of the numbers of pixels of similar colors to the feature candidate colors A to I included in a surrounding region other than the first to sixth partial regions, and the total numbers Sum of pixels of similar colors to the feature candidate colors A to I included in the entire image. As can be seen from FIG. 7, for example, the number of pixels of similar colors to the feature candidate color A is 5 in the first partial region, 3 in the second partial region, 1 in the third partial region, and 3 in the surrounding region.

Next, whether or not a pixel group in which pixels of similar colors to each of the feature candidate colors A to I continuously appear (that is, including pixels of similar colors) is independently formed is judged for each of the pixels A to I. For example, when the user unwantedly designates a background region as a target object to be tracked, a pixel group including pixels of similar colors to a feature candidate color may extend to a broad range up to a circumference of an image, and such target object cannot be tracked. A color as a feature color of a target object to be tracked may form a pixel group which has a small area and is independent of surrounding colors, and such color is preferably selected as a feature color of the target object. In other words, a feature candidate color, which forms a pixel group including pixels of similar colors to have an area smaller than a reference area, is preferably extracted as a feature color of the target object. Note that the reference area is set to preferentially extract a feature candidate color, which forms a pixel group of a smaller area, as a feature color of the target object.

Hence, in this embodiment, in order to detect a border between a pixel group, which includes a pixel of a feature candidate color (that is, each of the pixels A to I) and includes pixels of similar colors to that feature candidate color, and pixels of other colors, a border condition is set for the pixel of each feature candidate color, as given by:

Border condition=the number of pixels of similar colors to feature candidate color included in first partial region×ThBorderRatio  (2)

where ThBorderRatio: 0.25.

As given by equation (2), a value [the number of pixels] obtained by multiplying the number of pixels of similar colors to each feature candidate color included in the first partial region by the predetermined ratio (ThBorderRatio) is set as a border condition. Then, it is determined that a partial region which falls below the border condition includes a border between a pixel group of pixels of similar colors to a feature candidate color and pixels of other colors.

FIG. 8 shows calculation results of border conditions of the pixels A to I according to equation (2). When ThBorderRatio=25% in equation (2), for example, the border condition of the pixel A is 1.25 [the number of pixels], and that of the pixel F is 0.75 [the number of pixels].

Figure 9A:
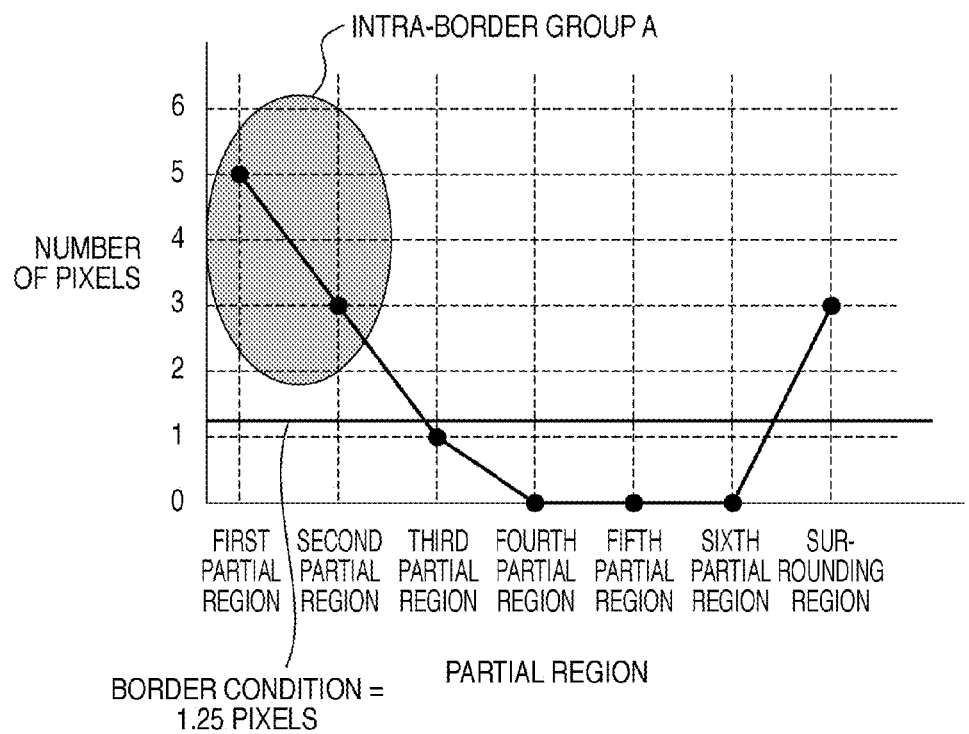
FIGS. 9A and 9B are graphs for explaining detection of borders between the pixel groups including pixels of similar colors to the feature candidate colors and pixels of other colors.
Figure 9B:
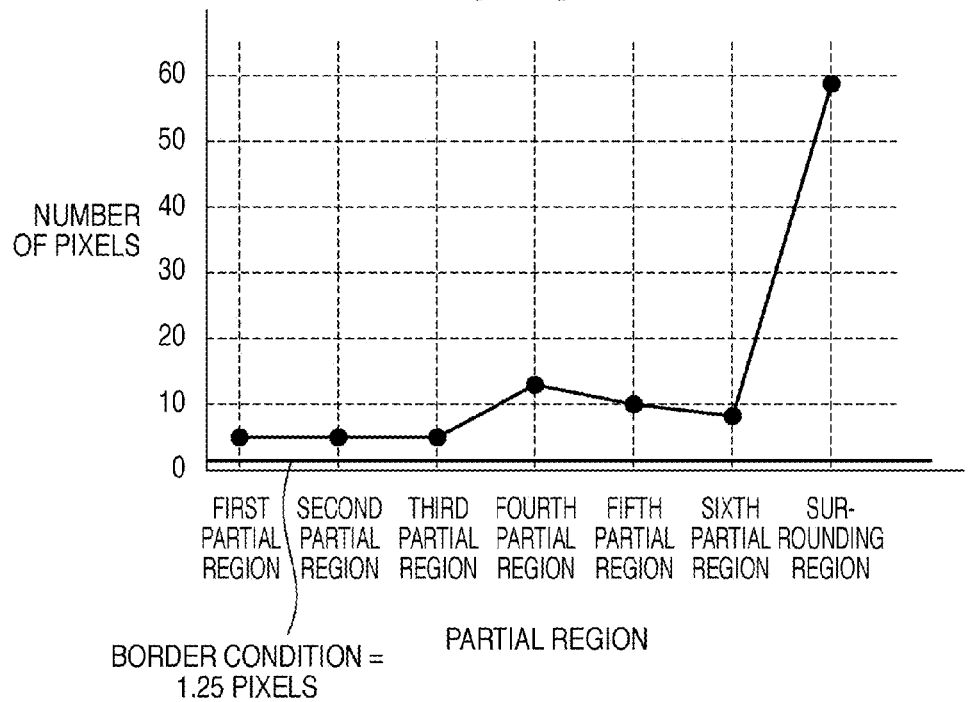

FIG. 9A is a graph for explaining detection of a border between a pixel group which includes the pixel A and also includes pixels of similar colors to the feature candidate color A, and pixels of other colors. FIG. 9B is a graph for explaining detection of a border between a pixel group which includes the pixel G and also includes pixels of similar colors to the feature candidate color G, and pixels of other colors. FIGS. 9A and 9B adopt partial regions on the abscissa, and the numbers of pixels on the ordinate. Also, in FIGS. 9A and 9B, the numbers of pixels of similar colors to the feature candidate colors A and G included in the first, second, third, fourth, fifth, and sixth partial regions and the surrounding region, respectively, are plotted.

As described above, since the border condition of the pixel A is 1.25 [the number of pixels], a partial region in which the number of pixels of similar colors to the feature candidate color A falls below 1.25 includes a border. Referring to FIG. 9A, since the number of pixels of similar colors to the feature candidate color A is 5 in the first partial region, 3 in the second partial region, and 1 in the third partial region, the number of pixels of similar colors to the feature candidate color A included in the third partial region falls below 1.25. Therefore, a border between the second and third partial regions is detected as that between the pixel group including pixels of similar colors to the feature candidate color A and pixels of other colors. Thus, it is judged that the pixel A forms a pixel group which includes five pixels included in the first partial region, and three pixels included in the second partial region.

On the other hand, since the border condition of the pixel G is 1.25 [the number of pixels] in the same manner as that of the pixel A, a partial region in which the number of pixels of similar colors to the feature candidate color G falls below 1.25 includes a border. However, referring to FIG. 9B, there is no partial region in which the number of pixels of similar colors to the feature candidate color G falls below 1.25. This means that pixels of similar colors to the feature candidate color G are distributed to the circumference of the image, and the feature candidate color G is more likely to be a background color.

In this manner, a border between a pixel group including pixels of similar colors to the feature candidate color and pixels of other colors is detected for each of the pixels A to I, and the number of pixels of that pixel group, that is, an area (first area) of the pixel group, is calculated. FIG. 10 shows the numbers AreaIn of pixels of the pixel groups including pixels of similar colors to the feature candidate colors A to I, and the total numbers (that is, areas (second areas)) Sum of pixels of similar colors to the feature candidate colors A to I included in the entire image. In this case, it is judged that a pixel for which no border is detected (the pixel G in this embodiment) is not selected as a feature color of the target object to be tracked, and the feature candidate color G as a color of the pixel G is excluded from the candidates of feature colors of the target object. Also, even for a pixel for which a border is detected, when an area of a pixel group is larger than a predetermined reference area, or when a pixel group includes pixels corresponding to an end of an image (end pixels), a feature candidate color of that pixel may be excluded from the candidate colors of feature colors of the target object.

Subsequently, a ratio of the number (AreaIn) of pixels of a pixel group of a pixel of a given feature candidate color to the total number (Sum) of pixels of similar colors to that feature candidate color included in the entire image is calculated as an intra-border color ratio according to:

$$\text{Intra-border color ratio} = (\text{AreaIn}/\text{Sum}) \times 100 [\%] \quad (3)$$

For example, since AreaIn is 1 and Sum is 1 for the pixel B, an intra-border color ratio is 100% (see FIG. 10). As the intra-border color ratio is higher, pixels of similar colors do not exist around the corresponding pixel, and that pixel can be considered as a feature color near the target object to be tracked (tracking target designated position).

As for the pixel I, since AreaIn is 2 and Sum is 18, an intra-border color ratio is 11% (see FIG. 10). Even when a border is detected for a pixel having a low intra-border color ratio, many pixels of similar colors are distributed around that pixel. Therefore, when the target object is to be tracked using a color of such pixel, another object (for example, an object which corresponds to pixels of similar colors included in a background) may be erroneously tracked in place of the target object to be tracked (original target object).

Hence, in this embodiment, whether or not a feature candidate color can be a feature color of the target object is judged based on the intra-border color ratio. FIG. 11A shows the sort result of the feature candidate colors A to I in descending order of intra-border color ratio. Also, FIG. 11B shows reference ratios respectively set for the feature candidate colors A to I sorted in descending order of intra-border color ratio. A reference ratio is used as an exclusion condition for excluding each of the feature candidate colors A to I from a candidate of a feature color of the target object to be tracked, and a feature candidate color having an intra-border color ratio which falls below a reference ratio is excluded from candidates of feature colors of the target object. In this embodiment, as shown in FIG. 11B, the reference ratio is set to exclude a feature candidate color having a lower intra-border color ratio from candidates of feature colors of the target object (in other words, to extract a feature candidate color having a higher intra-border color ratio as a feature color of the target object). Referring to FIG. 11B, the intra-border color ratio of the feature candidate color H is 27% which fall below 60% as a reference ratio. Likewise, the intra-border color ratio of the feature candidate color I is 11%, which fall below 70% as a reference ratio. Therefore, the feature candidate color H as a color of the pixel H and the feature candidate color I as a color of the pixel I are excluded from candidates of feature colors of the target object. Note that the reference ratio is not limited to the values shown in FIG. 11B, and an arbitrary value can be set.

Next, a relative feature degree of a feature candidate color is calculated. As a pixel group including pixels of similar colors has a smaller area, it is considered as a unique important color as a feature of the target object to be tracked. In this embodiment, in order to extract such color as a feature color of the target object, a feature degree is calculated. More specifically, as shown in FIG. 12A, the feature candidate colors A to I are sorted in ascending order of the number (AreaIn) of pixels of a pixel group of pixels of a feature candidate color. In this embodiment, the feature candidate color B is specified as that having the smallest number of pixels of the pixel group (that is, having the smallest area). Then, for each of the feature candidate colors A to I, a ratio of the smallest number (AreaInMin) of pixels of the numbers of pixels of pixel groups to the number (AreaIn) of pixels of a pixel group is calculated as a feature degree according to:

$$\text{Feature degree} = (\text{AreaInMin}/\text{AreaIn}) \times 100 [\%] \quad (4)$$

Referring to equation (4), in this embodiment, AreaIn-Min=1 (that is, the number of the pixel group of the pixel B), and AreaIn=the numbers of pixels of pixel groups of the pixels B, C, E, F, A, and D, respectively. FIG. 12A shows the feature degrees calculated using equation (4). Referring to FIG. 12A, the feature candidate color B having the smallest number of pixels of the pixel group has the highest feature degree, that is, 100%, since that degree is calculated by a division by the number of pixels of itself.

Hence, in this embodiment, it is judged based on the feature degree that each feature candidate color can be a feature color of the target object. FIG. 12B shows reference feature degrees respectively set for the feature candidate colors A to I which are sorted in ascending order of the number of pixels of the pixel group. The reference feature degree is an exclusion condition used to exclude each of the feature candidate colors A to I from candidates of feature colors of the target object, and a feature candidate color having a feature degree which falls below the reference feature degree is excluded from candidates of feature colors of the target object. In this embodiment, as shown in FIG. 12B, the reference feature degree is set to exclude a feature candidate color having a lower feature degree from candidates of feature colors of the target object (in other words, to extract a feature candidate color having a higher feature degree as a feature color of the target object). Referring to FIG. 12B, the feature degrees of the feature candidate colors F, A, and D are respectively 20%, 12%, and 7%, which fall below 30%, 45%, and 60% as corresponding reference feature degrees. Therefore, the feature candidate color F as a color of the pixel F, the feature candidate color A as a color of the pixel A, and the feature candidate color D as a color of the pixel D are excluded from candidates of feature colors of the target object.

In this manner, of the feature candidate colors A to I, the feature candidate colors B, C, and E for which the areas of the pixel groups including pixels of similar colors are smaller than the reference area, the intra-border color ratios are higher than the reference ratios, and the feature degrees are higher than the reference feature degrees are selected as feature colors of the target object to be tracked. As can be seen from FIGS. 5A to 5I, the feature candidate colors B, C, and E have no pixels of similar colors near the tracking target designated position, and unique feature candidate colors having smaller areas of the pixel groups are extracted as feature colors of the target object.

Figures 13A, 13B:
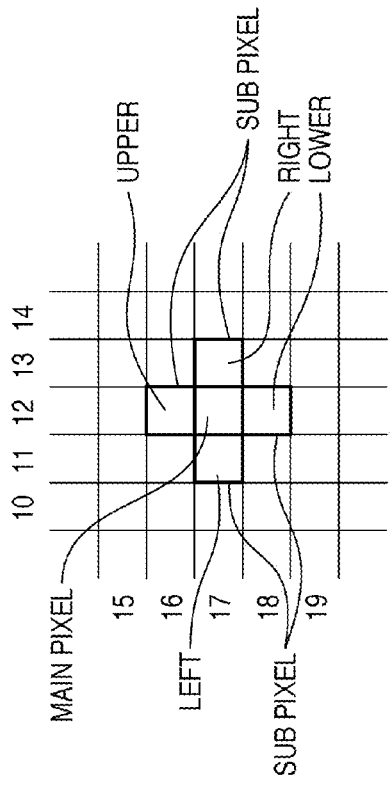
FIGS. 13A and 13B are views showing an example of a table which represents feature colors of a target object to be tracked.

The feature candidate colors B, C, and E of the pixels B, C, and E are stored in, for example, the temporary storage memory 130 or a memory of the system control unit 134 as feature colors of the target object to be tracked. Note that in this embodiment, the feature degrees of the feature candidate colors B, C, and E are also stored in this case as main pixels, as shown in FIG. 13A. Also, as shown in FIGS. 13A and 13B, colors of pixels which neighbor the upper, lower, right, and left positions of the pixels B, C, and E are stored as sub pixels in the RGB format. Since matching degrees with the colors of the sub pixels are also used upon tracking the target object, the tracking precision of the target object can be improved. In this embodiment, assume that the feature candidate colors B, C, and E (that is, the colors extracted by the aforementioned processing) are stored as static feature colors of the target object. Such static feature colors are feature colors which are not updated once they are stored. Also, in this embodiment, a dynamic feature color of the target object is stored, as will be described later. Such dynamic feature color is a feature color which is updated as needed during tracking of the target object. When the dynamic feature color is also used upon tracking the target object, even when the target object or an environment changes, the target tracking operation can be continued. In this way, the temporary storage memory 130 or the memory of the system control unit 134 serves as a first storage unit which stores the static feature colors and a second storage unit which stores the dynamic feature color.

The target object tracking operation using the static and dynamic feature colors shown in FIG. 13A will be practically explained below. Basically, a pixel of a color similar to feature colors (the feature candidate colors B, C, and E in this embodiment) of the target object is searched for in the image, and a position of the pixel of the color similar to the feature colors (that is, having higher similarities with the feature colors) is decided as the target object (a position thereof). Note that upon tracking the target object, the feature degrees and the matching degrees of colors of sub pixels which neighbor the upper, lower, right, and left positions of the main pixels are also used, as described above.

When an object of similar colors to the color of the target object is included in the image (background), a position closer to the position of the target object decided in the previous tracking operation is required to have a higher similarity. Hence, in this embodiment, a weight table is used. The weight table is set with weight amounts according to distances from a base point at positions of respective pixels by setting a pixel corresponding to the position of the target object decided in the previous tracking operation as the base point. Note that a change amount of weight amounts according to distances from the base point can be appropriate set according to various conditions.

Figure 14:
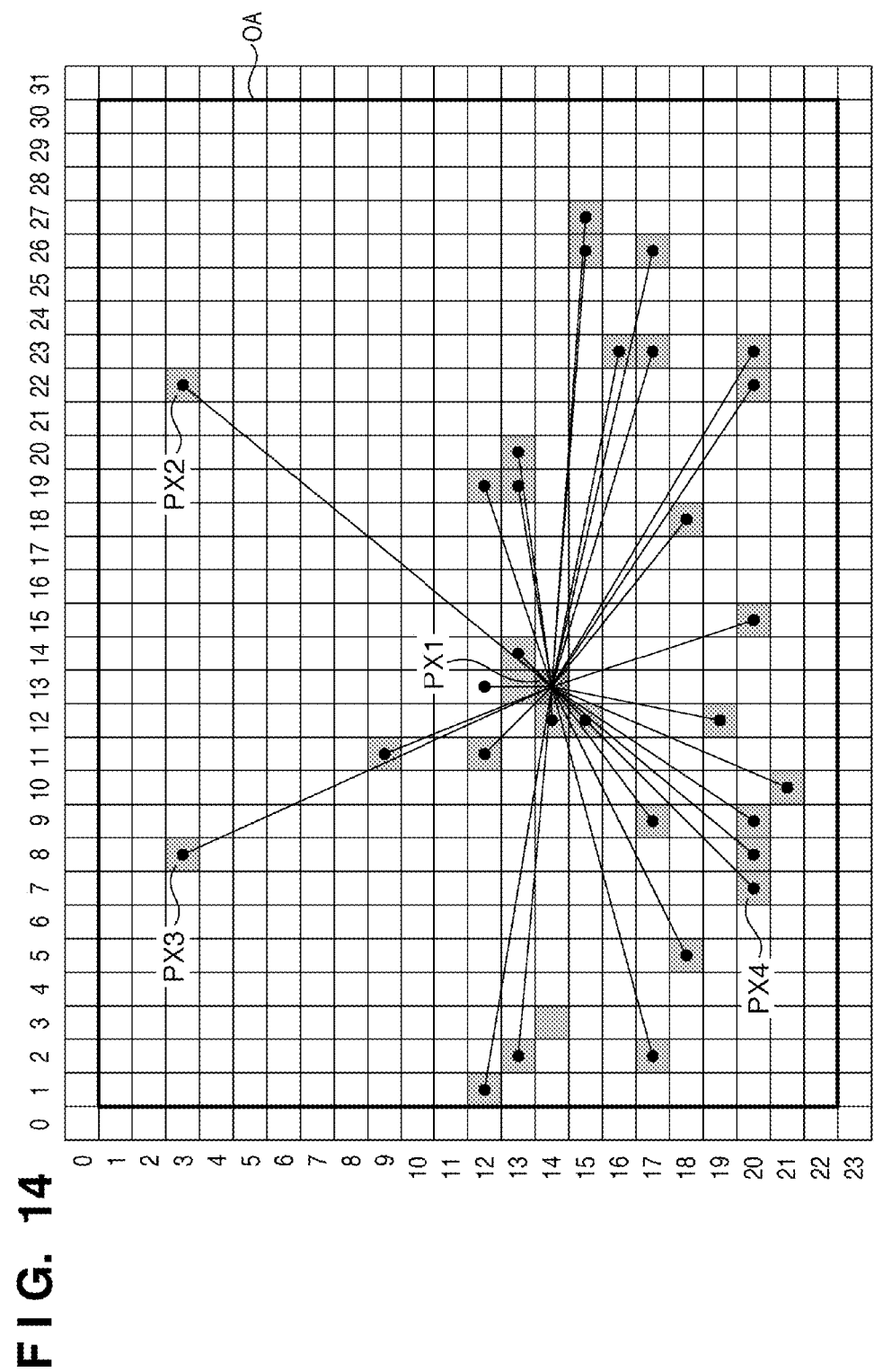
FIG. 14 is a view showing distributions in an image of pixels of similar colors to the feature colors of the target object to be tracked.

In order to generate the weight table, how pixels of colors similar to the feature colors of the target object to be tracked are distributed in the image is calculated. FIG. 14 shows a distribution of pixels of colors similar to the feature colors of the target color to be tracked in the image. Referring to FIG. 14, a pixel PX1 is a pixel corresponding to the position of the target object decided in the previous tracking operation (that is, the latest target object position). Gray pixels including pixels PX2, PX3, and PX4 are pixels of colors similar to the feature colors of the target object (similar pixels). A monitor region (third region) OA is a region used to search for pixels of colors similar to the feature colors of the target object, and is set to cover the entire image (region setting). Note that as given by inequalities (1), when differences between R, G, and B components of a feature color of the target object and those of a pixel of interest fall within the range of the predetermined signal level, it is judged that a color of the pixel of interest is similar to the feature color of the target object.

Then, a sum total (DistanceSum) of distances between the position (TargetPosX, TargetPosY) of the pixel PX1 as the latest target object position and similar pixel positions (FindPosX, FindPosY) is calculated as a similar color distribution degree according to:

$$\text{DistanceSum} = \Sigma \sqrt{(\text{abs}(\text{TargetPos}X - \text{FindPos}X(x))^2 + \text{abs}(\text{TargetPos}Y - \text{FindPos}Y(Y))^2)} \quad (5)$$

where X: 0 to 31, and Y: 0 to 23.

As the similar color distribution degree DistanceSum is larger, this means that many similar pixels exist around the target object. Hence, a tracking error is more likely to occur. Hence, the change amount of the weight amounts is changed according to the similar color distribution degree to set weight amounts (that is, larger weight amounts) which lower similarities as the distances from the pixel (base point) corresponding to the position of the target object decided in the previous tracking operation are larger, thus reducing possibility of occurrence of a tracking error.

Figure 15:
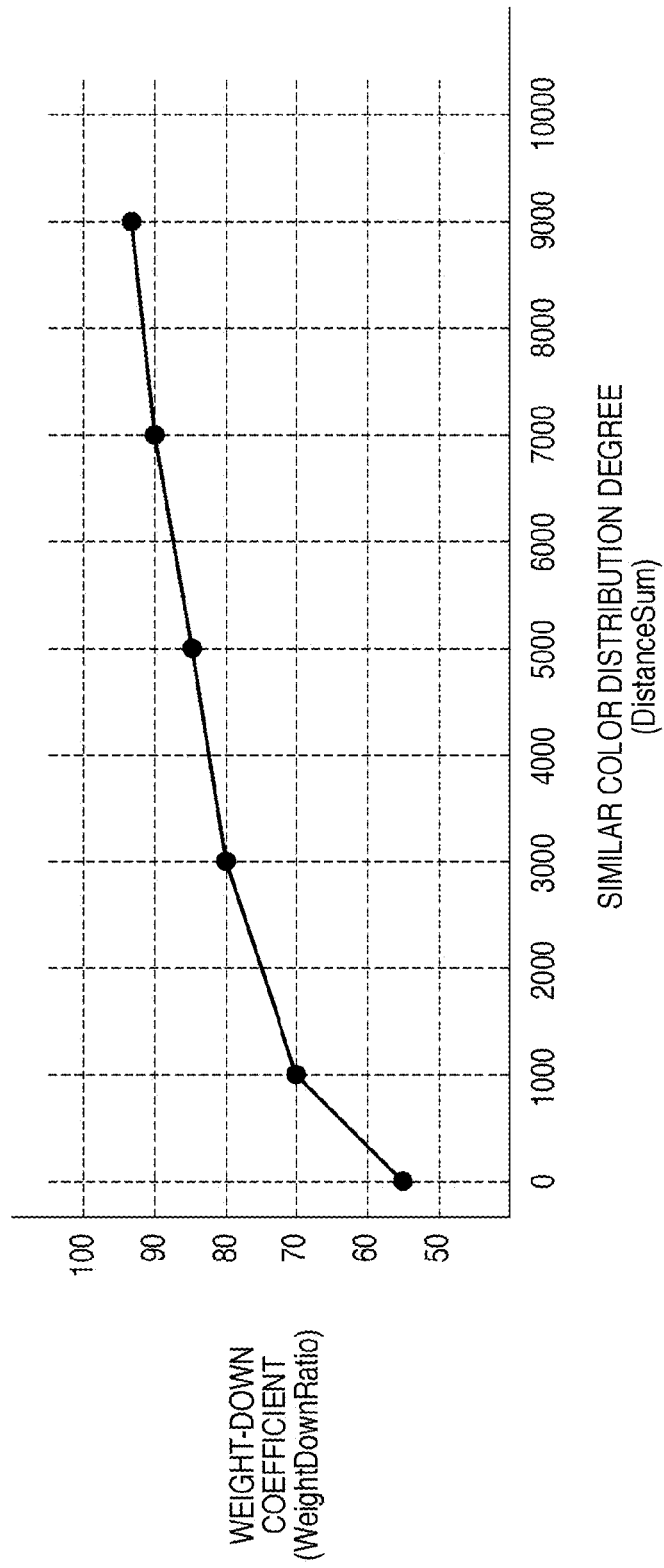
FIG. 15 is a graph showing weight-down coefficients according to similar color distribution degrees.

FIG. 15 shows weight-down coefficients (WeightDownRatio) according to the similar color distribution degrees (DistanceSum). FIG. 15 adopts similar color distribution degrees (DistanceSum) on the abscissa, and weight-down coefficients (WeightDownRatio) on the ordinate. As can be seen from FIG. 15, the weight-down coefficient becomes larger with increasing similar color distribution degree. The weight-down coefficient becomes an important parameter upon generation of the weight table.

Figure 16:
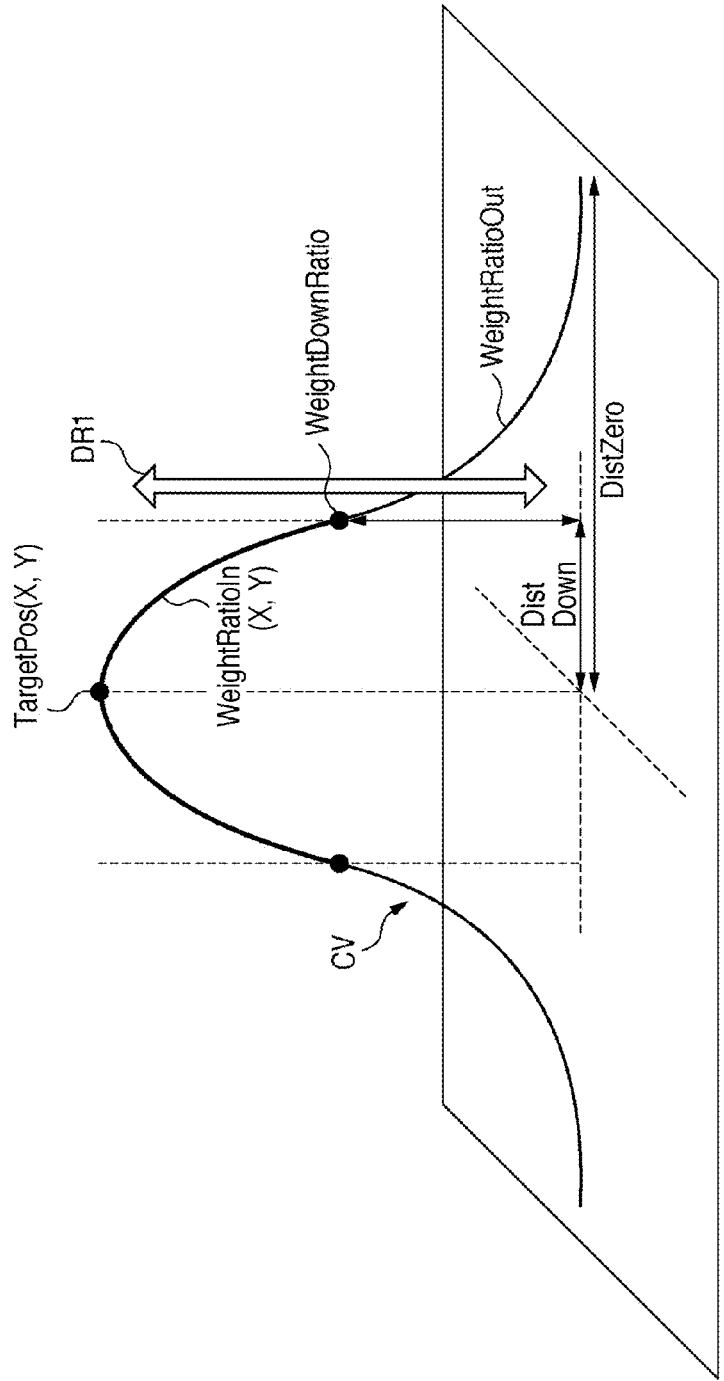
FIG. 16 is a view conceptually showing generation of a weight table.

FIG. 16 conceptually shows generation of the weight table. A curve CV corresponds to a change of the weight table, and expresses that the weight amounts change to have the position (TargetPosX, TargetPosY) of the pixel PX1 as the latest target object position as the base point. The curve CV is configured by two exponential curves, that is, a curve WeightRatioIn(X, Y) and a curve WeightRatioOut(X, Y). The curve WeightRatioIn(X, Y) couples the position (TargetPosX, TargetPosY) and a weight-down position (DistDown) separated by a predetermined distance from that position. The curve WeightRatioOut(X, Y) couples the weight-down position (DistDown) and an image end position DistZero. The weight-down position (DistDown) moves upward or downward in a weight amount increasing/decreasing direction DR1 according to the weight-down coefficient (WeightDownRatio) shown in FIG. 15. Thus, a steep degree of the change amount of the weight amount near the position (TargetPosX, TargetPosY) of the pixel PX1 as the latest target object position and the weight amounts in an image circumferential region are dynamically generated.

The curves WeightRatioIn(X, Y) and WeightRatioOut(X, Y) required to calculate the weight amount at the position of each pixel are respectively calculated by:

$$\text{WeightRatioIn}(X,Y) = 100 - (\text{Dist}(X,Y)^2/\text{DistDown}^2) \times \text{WeightDownRatio}$$

$$\text{WeightRatioOut}(X,Y) = (\text{Dist}(X,Y)^2/(\text{DistZero}-\text{DistDown})^2) \times (100-\text{WeightDownRatio}) \quad (6)$$

where X: 0 to 31, Y: 0 to 23, and Dist(X, Y): a distance from the position (TargetPosX, TargetPosY) of the pixel PX1 as the latest target object position.

The weight table is dynamically generated based on the weight-down coefficients decided from the similar color distribution degree and the target object position decided in the previous tracking operation. FIGS. 17A to 17C show the concept of the weight table. For example, when the circumference of the image includes nearly no similar pixels, the weight-down coefficient is set to be a small value, and a weight table in which a change amount of weight amounts is moderate, and a certain weight amount is given to the circumference is generated, as shown in FIG. 17A. When the circumference of the image includes many similar pixels, the weight-down coefficient is set to be a large value, and a weight table in which a change amount of weight amounts becomes steep, and a small weight amount is given to the circumference is generated, as shown in FIG. 17B or 17C. Note that in this embodiment, a change in weight amount is expressed using the exponential curve. Alternatively, a change in weight amount may be expressed using a simple line segment. Also, by setting a plurality of weight-down positions, a change in weight amount approximate to a curve can be expressed using only line segments.

Figure 18A:
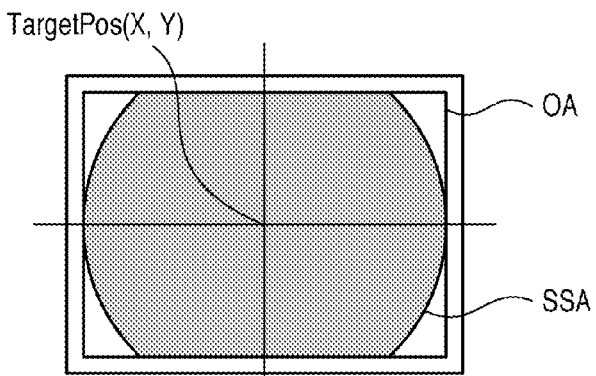
FIGS. 18A to 18D are views showing examples of search regions set based on the weight table.
Figure 18B:
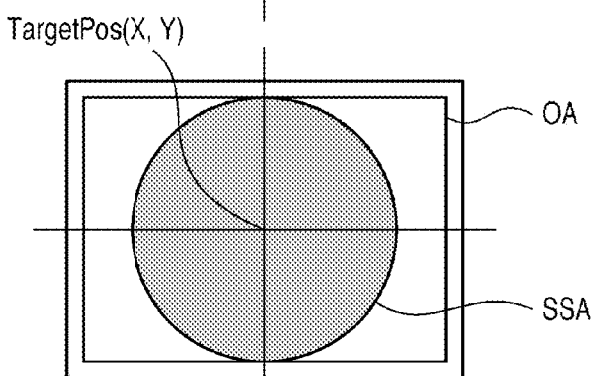
Figure 18C:
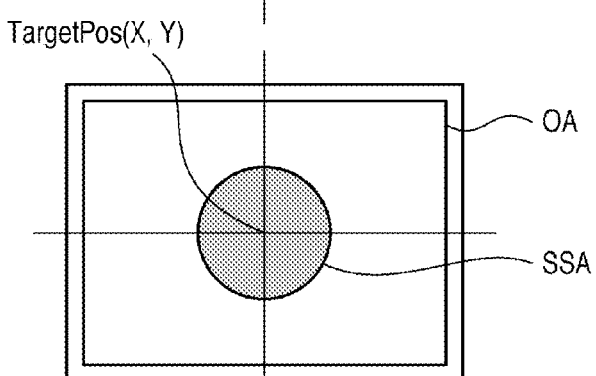
Figure 18D:
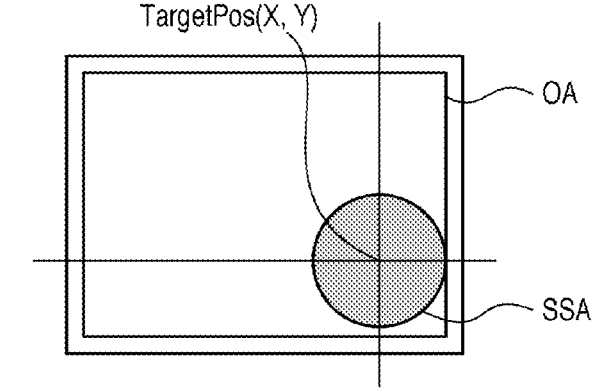

Based on the weight table generated in this way, a static search region (first region) SSA used to search for the target object to be tracked is set (region setting). Note that the static search region SSA is a region required to track the target object using the static feature colors of the target object, and a region in which the weight amounts become equal to or larger than a predetermined amount is set as the static search region SSA, as shown in FIGS. 17A to 17C and FIGS. 18A to 18C. FIGS. 18A to 18C respectively show the static search regions SSA set based on the weight tables shown in FIGS. 17A to 17C. As can be seen from FIGS. 18A to 18C, as the change amount of the weight amounts is steeper, the static search region SSA becomes smaller. Note that FIG. 18D shows a case in which the position (TargetPosX, TargetPosY) of the pixel PX1 as the target object position is not located at the center of the image.

When the static search region SSA becomes smaller, if the target object to be tracked has moved abruptly or camera shake of the image capturing apparatus 1 has occurred, the target tracking operation is likely to fail. On the other hand, when the static search region SSA becomes larger, if the image includes many similar pixels, a tracking error is likely to occur. Therefore, it is effective to set the static search region SSA according to the weight amounts of the weight table.

When similar pixels are searched from the entire region in the image, the processing load on the system becomes heavier, resulting in an increase in consumption power and an increase in cost required to build the system which can withstand a heavier load. On the other hand, in this embodiment, since the range of the static search region SSA is limited according to the weight amounts, the processing load on the system can be reduced, and an increase in consumption power and the like can be suppressed.

Figure 19:
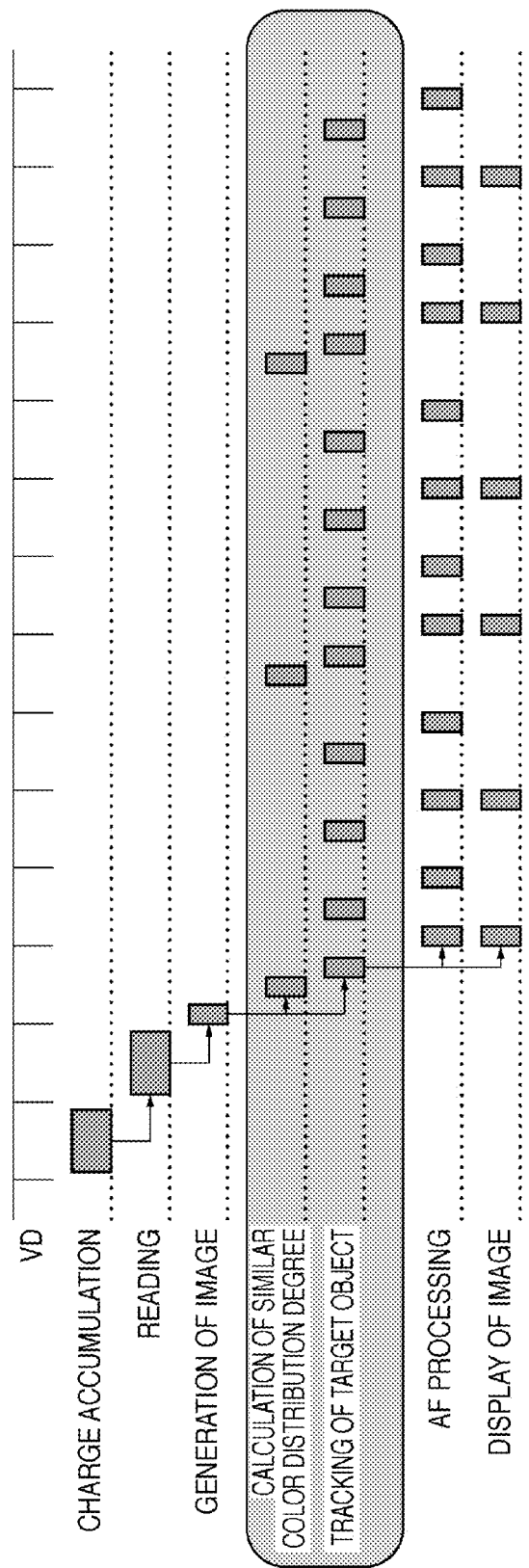
FIG. 19 is a timing chart for reducing a processing load.

FIG. 19 is a timing chart for reducing the processing load in the image capturing apparatus 1. As shown in FIGS. 18A to 18C, the monitor region OA is set to cover the entire image, and the static search region SSA is set to be smaller than the monitor region OA although it changes according to the weight amounts. In this way, an area of the monitor region OA is larger than that of the static search region SSA. By prolonging an operation cycle required to calculate the similar color distribution degree, the processing load can be reduced. A longer operation cycle required to track the target object has a serious influence on the tracking performance. However, the longer operation cycle required to calculate the similar color distribution degree has nearly no influence on the tracking performance. Hence, as shown in FIG. 19, the electric charge accumulation operation in the image sensing element 118, the electric charge read operation from the image sensing element 118, and the image generation operation are set to be executed at cycles of an image capturing synchronization signal VD. Also, the similar color distribution degree calculation operation (and the weight-down coefficient calculation operation) required to generate the weight table is set to be executed at, for example, cycles four times those of the image capturing synchronization signal VD. Furthermore, the target tracking operation is set to be executed at the cycles of the image capturing synchronization signal VD. In this manner, the operation cycle of the similar color distribution degree calculation operation is set to be longer than the target object tracking operation cycle. Note that the AF processing and the image display operation can be set to be executed at arbitrary cycles.

Figure 20B:
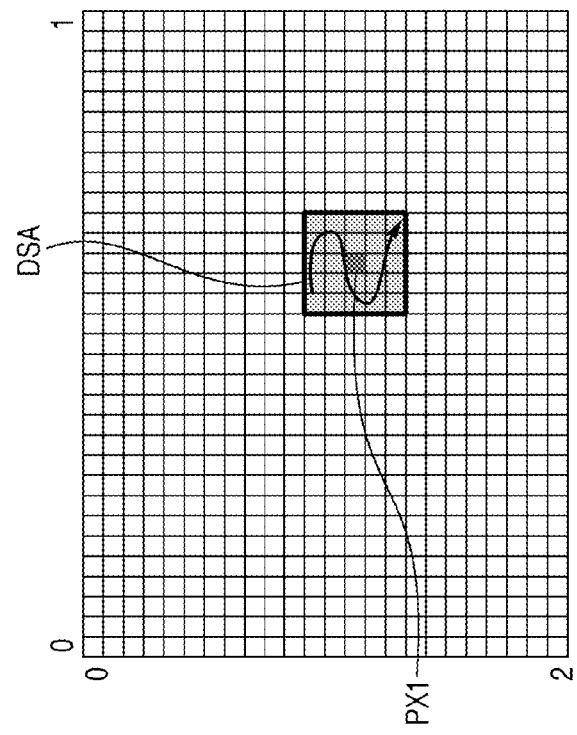
FIGS. 20A and 20B are views showing a static search region and dynamic search region set on an image.
Figure 20A:
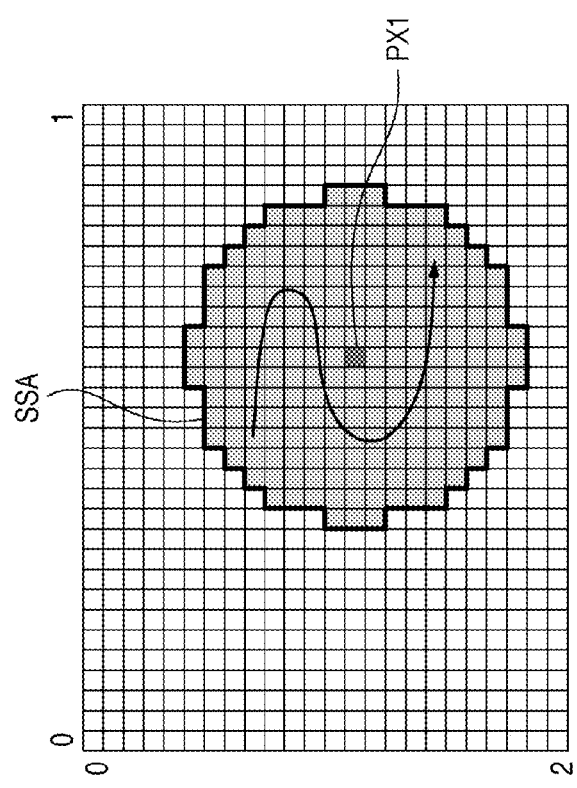

FIG. 20A shows an example of the static search region SSA set on an image divided into 32×24 blocks. Also, in this embodiment, a dynamic search region (second region) DSA is set to have the pixel PX1 corresponding to the target object position decided in the previous tracking operation as a base point (region setting), as shown in FIG. 20B. The dynamic search region DSA is used to track the target object using the dynamic feature color of the target object. In this embodiment, the dynamic search region DSA is set as a pixel region of 5 pixels×5 pixels including the pixel PX1, but the size of this region is not particularly limited. Also, the dynamic search region DSA is not limited to a rectangular region, but it may be, for example, a circular region. Note that the dynamic search region DSA is set to have an area smaller than that of the static search region SSA. This is because the target tracking operation using the dynamic feature color searches for a color similar to the dynamic feature color stored for a previous frame image from only positions near the dynamic feature color, and the dynamic search region DSA need not be broadened.

In the static search region SSA and dynamic search region DSA which are set in this way, the target object is tracked. Initially, pixels of colors (similar pixels) similar to the feature colors (static and dynamic feature colors) of the target object are searched for. More specifically, as shown in FIG. 13A, in this embodiment, since the feature colors of the target object are stored in the RGB format, differences ΔR, ΔG, and ΔB between R, G, and B components of each feature color of the target object and those of a pixel of interest are calculated, as given by:

$$\Delta R = abs(R(N) - R(X, Y))$$

$$\Delta G = abs(G(N) - G(X, Y))$$

$$\Delta B = abs(B(N) - B(X, Y)) \quad (7)$$

where N: a static or dynamic feature color, X: a horizontal coordinate, and Y: a vertical coordinate.

Then, when the differences ΔR, ΔG, and ΔB fall within the range of the predetermined signal level ThRGB, it is judged that the color of the pixel of interest is similar to the feature color, as given by:

$$\Delta R \leq ThRGB$$

$$\Delta G \leq ThRGB$$

$$\Delta B \leq ThRGB \quad (8)$$

In equalities (8), the signal level ThRGB can be set to be different values between the target tracking operation using the static feature colors and that using the dynamic feature color. Also, in the target tracking operation using the dynamic feature color, the signal level ThRGB can be changed to an appropriate value according to a scene. Note that in this embodiment, since there are the feature candidate colors B, C, and E as the static feature colors, the feature color is selected according to the priority order (the order of the feature candidate colors B, C, and E) shown in FIG. 12B to judge whether or not the color of the pixel of interest is similar to the selected feature color. When it is judged that the color of the pixel of interest is similar to selected one of the feature colors, similarity judgment for the feature colors in the lower priority order is skipped.

Figure 21:
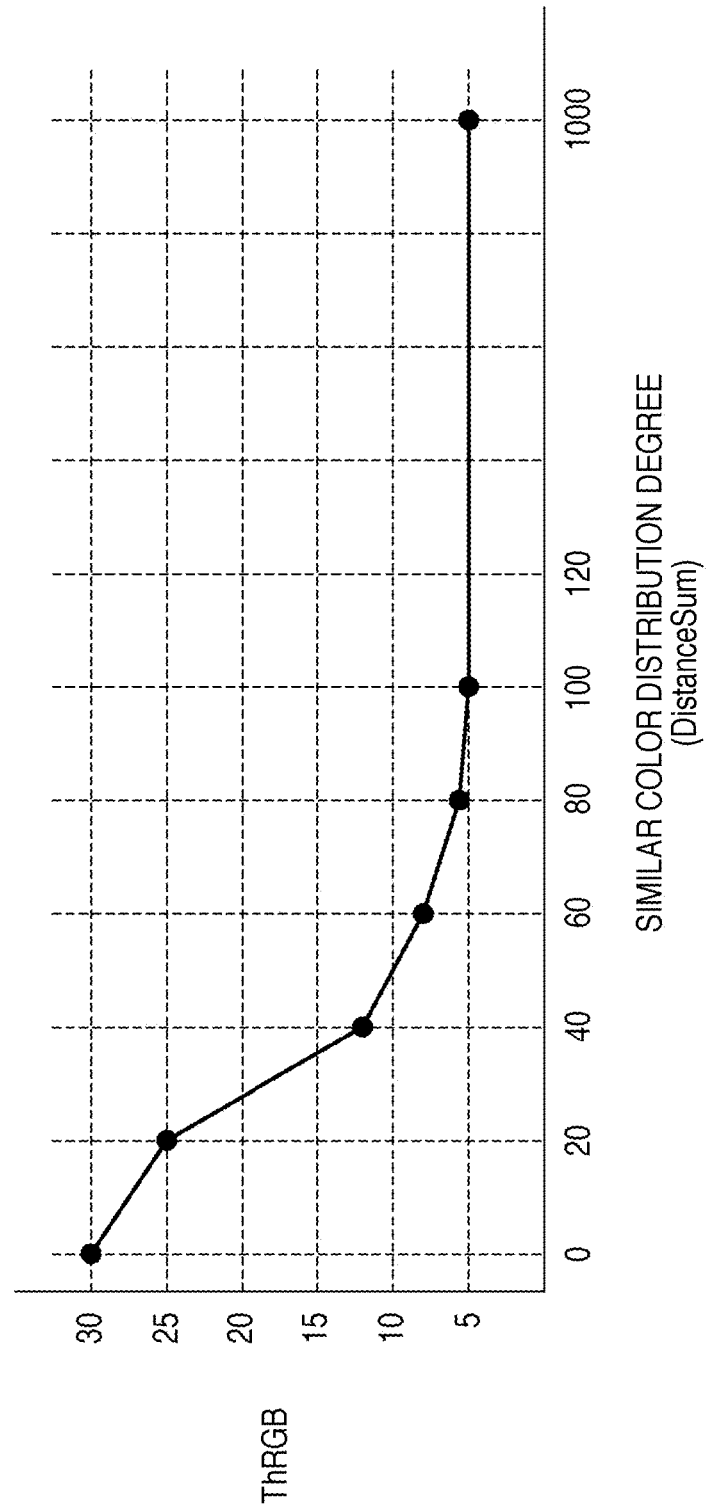
FIG. 21 is a graph showing the concept of a table required to calculate a signal level from the similar color distribution degrees.

When the target object is tracked using the static feature colors, the signal level ThRGB is set to be a fixed value (for example, 30LSB), thus allowing to determine a similar image using the same (that is, constant) criterion irrespective of a scene. On the other hand, when the target object is tracked using the dynamic feature color, the signal level ThRGB is calculated from a function (table) shown in FIG. 21 using the aforementioned similar color distribution degree (Distance-Sum). FIG. 21 adopts similar color distribution degrees on the abscissa, and signal levels ThRGB on the ordinate. Referring to FIG. 21, the signal level ThRGB becomes smaller (that is, a similar pixel determination criterion becomes higher) with increasing similar color distribution degree. This is for the following reason. That is, as the circumference of the image includes a larger number of similar pixels, a tracking error is more likely to occur. Hence, by setting a higher similar pixel determination criterion, occurrence of a tracking error is suppressed.

For each of similar pixels determined in this way, color similarities (a first similarity indicating a similar degree with each static feature color and a second similarity indicating a similar degree with the dynamic feature color) indicating similar degrees with the feature colors of the target object are calculated according to:

Color similarity=$\{((ThRGB-\Delta R)/ThRGB)+((ThRGB-\Delta G)/ThRGB)+((ThRGB-\Delta B)/ThRGB)\}\times 100[\%]$ (9)

The color similarity assumes 100% when all the R, G, and B components of a similar pixel match those of the feature color of the target object, that is, when all of ΔR, ΔG, and ΔB assume zero. Also, the color similarity becomes closer to 0% as the ΔR, ΔG, and ΔB are closer to the signal level ThRGB.

Figure 22:
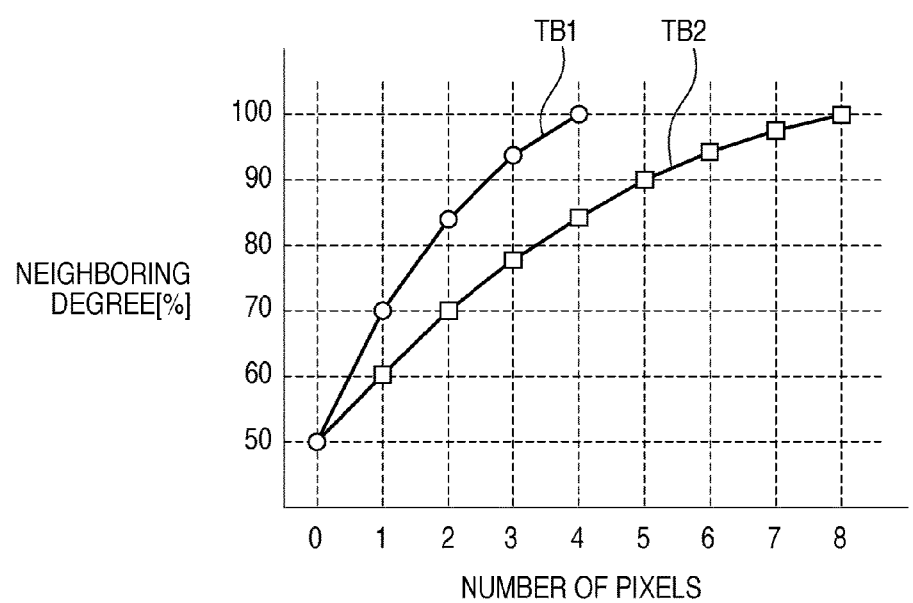
FIG. 22 is a graph showing the concept of a table required to calculate a neighboring degree.

Next, it is determined whether or not colors of pixels which neighbor the upper, lower, right, and left positions of a similar pixel of interest are similar to colors of sub pixels (see FIG. 13A). This determination (a criterion thereof) is the same as that of similar pixels described above. The number of pixels which are determined to be similar to the colors of the sub pixels is counted, and a neighboring degree is calculated from a function (table) shown in FIG. 22. FIG. 22 adopts the numbers of pixels, which are determined to be similar to the colors of the sub pixels, on the abscissa, and the neighboring degrees on the ordinate. A table TB1 is used when four pixels which neighbor the upper, lower, right, and left positions of a similar pixel are used as evaluation targets of the neighboring degree. When it is determined that the colors of all the four pixels which neighbor the upper, lower, right, and left positions of the similar pixel are similar to those of the sub pixels (that is, when the number of pixels which are determined to be similar to the colors of the sub pixels is four), the neighboring degree is 100%. When it is determined that the colors of all the four pixels which neighbor the upper, lower, right, and left positions of the similar pixel are not similar to those of the sub pixels (that is, when the number of pixels which are determined to be similar to the colors of the sub pixels is zero), the neighboring degree is 50%. Note that in this embodiment, the four pixels which neighbor the upper, lower, right, and left positions of a similar pixel are used as evaluation targets of the neighboring degree. Alternatively, eight pixels including those which neighbor in oblique directions of the similar pixel can also be used as evaluation targets of the neighboring degree. In this case, the neighboring degree can be calculated from a table TB2 used when eight pixels are used as evaluation targets of the neighboring degree.

Then, an evaluation value is calculated for each of similar pixels using the color similarity, neighboring degree, and feature degree according to:

Evaluation value=EVA_BASE×(color similarity/100)×(neighboring degree/100)×(feature degree/100) (10)

Note that the evaluation value is calculated for each of the static and dynamic feature colors.

In this embodiment, in order to normalize the evaluation value, EVA_BASE is defined to be 255LSB, and a value obtained by multiplying this value by the color similarity, neighboring degree, and feature degree is calculated as the evaluation value. For example, when all of the color similarity, neighboring degree, and feature degree are 100%, 255LSB which are highest as the evaluation value are calculated, and the evaluation value lowers as the color similarity, neighboring degree, and feature degree are decreased.

Figures 23A, 23B:
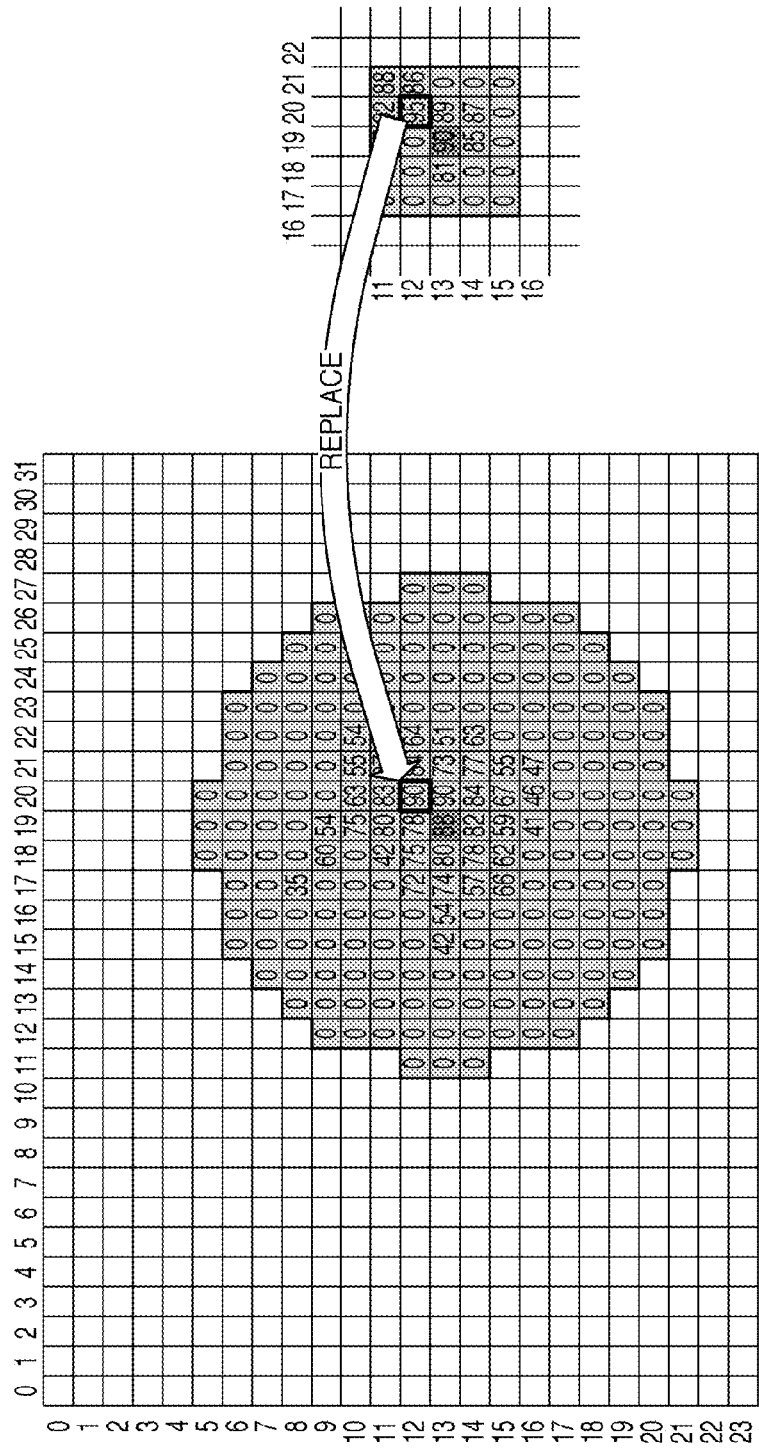
FIGS. 23A and 23B are views showing calculation results of evaluation values for the static and dynamic search regions.

FIG. 23A shows the calculation results of the evaluation values (static evaluation values) for the static search region SSA in which the target object is tracked using the static feature colors. FIG. 23B shows the calculation results of the evaluation values (dynamic evaluation values) for the dynamic search region DSA in which the target object is tracked using the dynamic feature color. In this case, the static evaluation values shown in FIG. 23A and the dynamic evaluation values shown in FIG. 23B are combined.

More specifically, a highest dynamic evaluation value of those shown in FIG. 23B is calculated. In this embodiment, a dynamic evaluation value of a pixel at a position (20, 12) is highest. When the dynamic evaluation value of this pixel is compared with a static evaluation value of a pixel at the same position (20, 12), the dynamic evaluation value is 95LSB, the static evaluation value is 90LSB, and the dynamic evaluation value is larger than the static evaluation value. In such case, as shown in FIGS. 23A and 23B, 90LSB as the static evaluation value are replaced by 95LSB as the dynamic evaluation value. As a result, an evaluation value map which is formed based on the static evaluation values and in which one evaluation value is replaced by the dynamic evaluation value of the pixel which has a highest similarity to the dynamic feature color is generated.

Figure 24B:
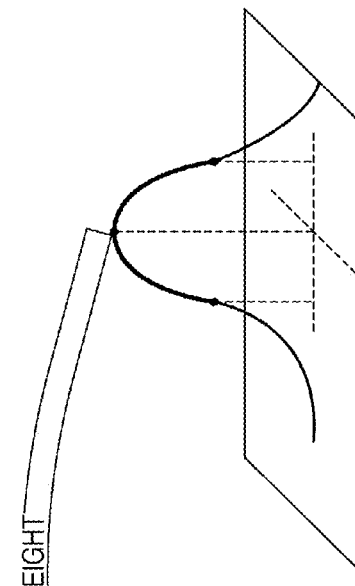
FIGS. 24A and 24B are views for explaining generation of an evaluation value map weighted by weight amounts to have a pixel corresponding to the position of a target object as a base point.

Next, for the evaluation values generated by combining the static and dynamic evaluation values, respective pixels are multiplied by weight amounts of the weight table (see FIG. 24B), as given by:

$$\Sigma Eva(x,y) \times (WeightRatio(x,y))/100 \quad (11)$$

Figure 24A:
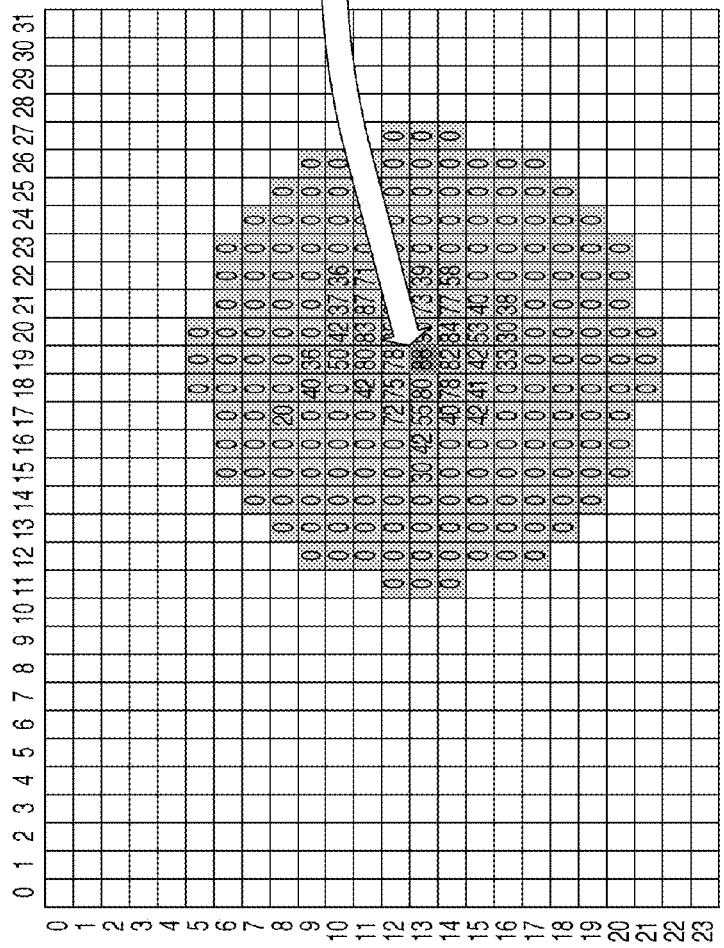

In this manner, the evaluation value map, which is weighted by the weight amounts to have the pixel corresponding to the position of the target object decided by the previous tracking operation as the base point, is generated, as shown in FIG. 24A. Such weighting can eliminate tracking errors to objects and a background having colors similar to that of the target object to be tracked. However, when the weight table having a steep change amount of the weight amounts is generated, since the motion of the target object may fail to be tracked, the table which decides the weight-down coefficient (see FIG. 15) has to be generated appropriately.

Figure 25:
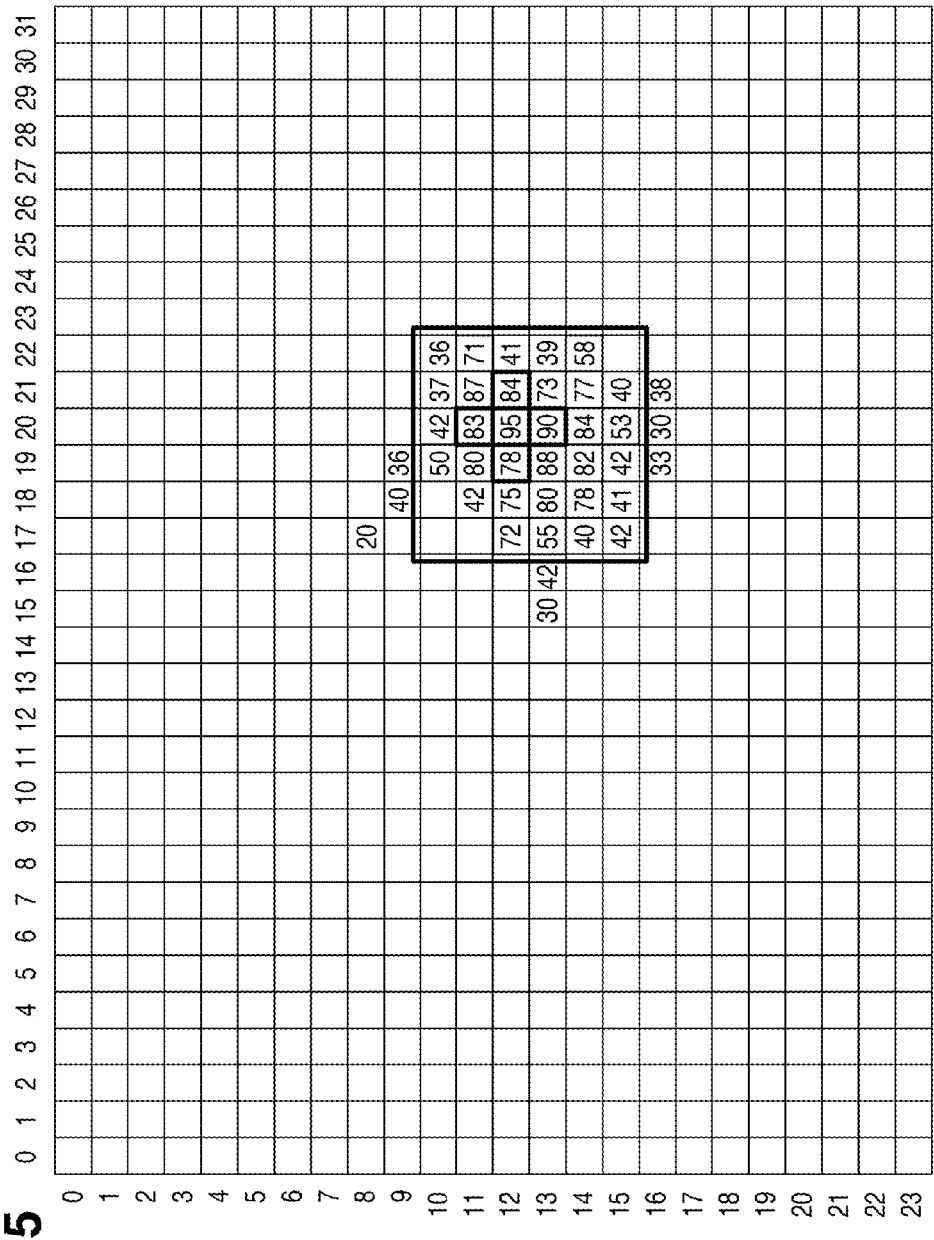
FIG. 25 is a view for explaining decision of a position of a target object and updating of a dynamic feature color.

The position of the target object is decided from the evaluation value map generated in this way. As shown in FIG. 25, a position (20, 12) of a pixel having the highest evaluation value is specified from the evaluation value map which is generated by combining the static and dynamic evaluation values and being weighted by the weight amounts. Then, the position (20, 12) of this pixel is defined as a base point, and a region including pixels having high evaluation values to some extent is decided as the target object. However, when the highest evaluation value is lower than a reference value (that is, when the similarity does not satisfy a reference similarity), it is determined that the target tracking operation fails. For example, the reference value is calculated by:

$$\text{Reference value} = EvaMax \times (ThClipRatio/100) \quad (12)$$

where ThClipRatio: 45%, and EvaMax: a maximum evaluation value.

Referring to equation (12), the reference value is a value obtained by multiplying the maximum evaluation value EvaMax by a predetermined ratio ThClipRatio. In an evaluation value map shown in FIG. 25, a reference value is 42LSB from equation (12), and pixels having evaluation values larger than this reference value (gray pixels in FIG. 25) are extracted. Then, a region which surrounds the pixels having the evaluation values larger than the reference value is decided as the target object. Note that in this embodiment, a rectangular region is used as the region which surrounds the pixels having the evaluation values larger than the reference value. This is because this rectangular region is used as, for example, a distance measurement region in the AF processing.

Also, a color of a pixel corresponding to the position of the target object decided in this way is updated as the dynamic feature color. More specifically, in FIG. 25, R, G, and B components of the pixel having the highest evaluation value (that at the position (20, 12)) are calculated. Then, it is determined whether or not the R, G, and B components of the pixel having the highest evaluation value are similar to each static feature color (see FIG. 13A), according to:

$$\Delta R = abs(EvaMaxR - R(N))$$

$$\Delta G = abs(EvaMaxG - G(N))$$

$$\Delta B = abs(EvaMaxB - B(N)) \quad (13)$$

where N: a static feature color.

$$\Delta R \leq ThRGB$$

$$\Delta G \leq ThRGB$$

$$\Delta B \leq ThRGB \quad (14)$$

where ThRGB: a fixed value (40LSB).

When all of differences $\Delta R$, $\Delta G$, and $\Delta B$ between the R, G, and B components of the pixel having the highest evaluation value (that at the position (20, 12)) and those of each static feature color fall below the signal level ThRGB, the dynamic feature color is updated. More specifically, average values of R, G, and B components of pixels which neighbor the upper, lower, right, and left positions of the pixel having the highest evaluation value (that at the position (20, 12)) are updated (stored) as the dynamic feature color. Note that the updated dynamic feature color is used in the next target object tracking operation.

A case will be examined below wherein a template and color information of a pixel corresponding to the position of the target object decided in the previous tracking operation are unconditionally updated as needed when the target object is periodically tracked. In this case, when another object cuts across in front of the target object, or when the target object changes, an object which is different from the target object is gradually tracked, thus causing a tracking error. On the other hand, in this embodiment, a color which is considerably different from each static feature color extracted at the beginning of tracking of the target object is not updated as a dynamic feature color, thus eliminating occurrence of a tracking error.

Figure 26A:
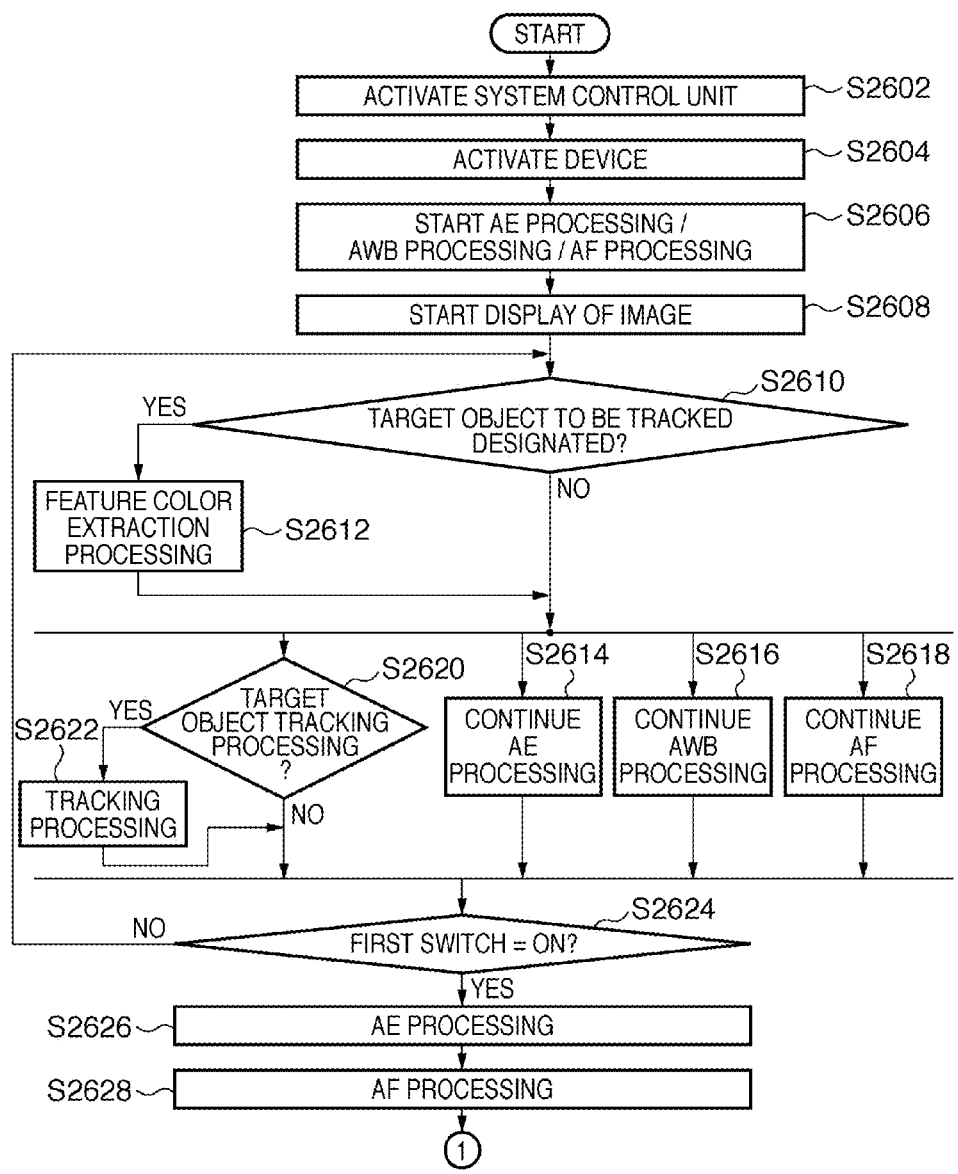
FIGS. 26A and 26B are flowcharts for explaining the overall operation of the image capturing apparatus shown in FIGS. 1A to 1C.
Figure 26B:
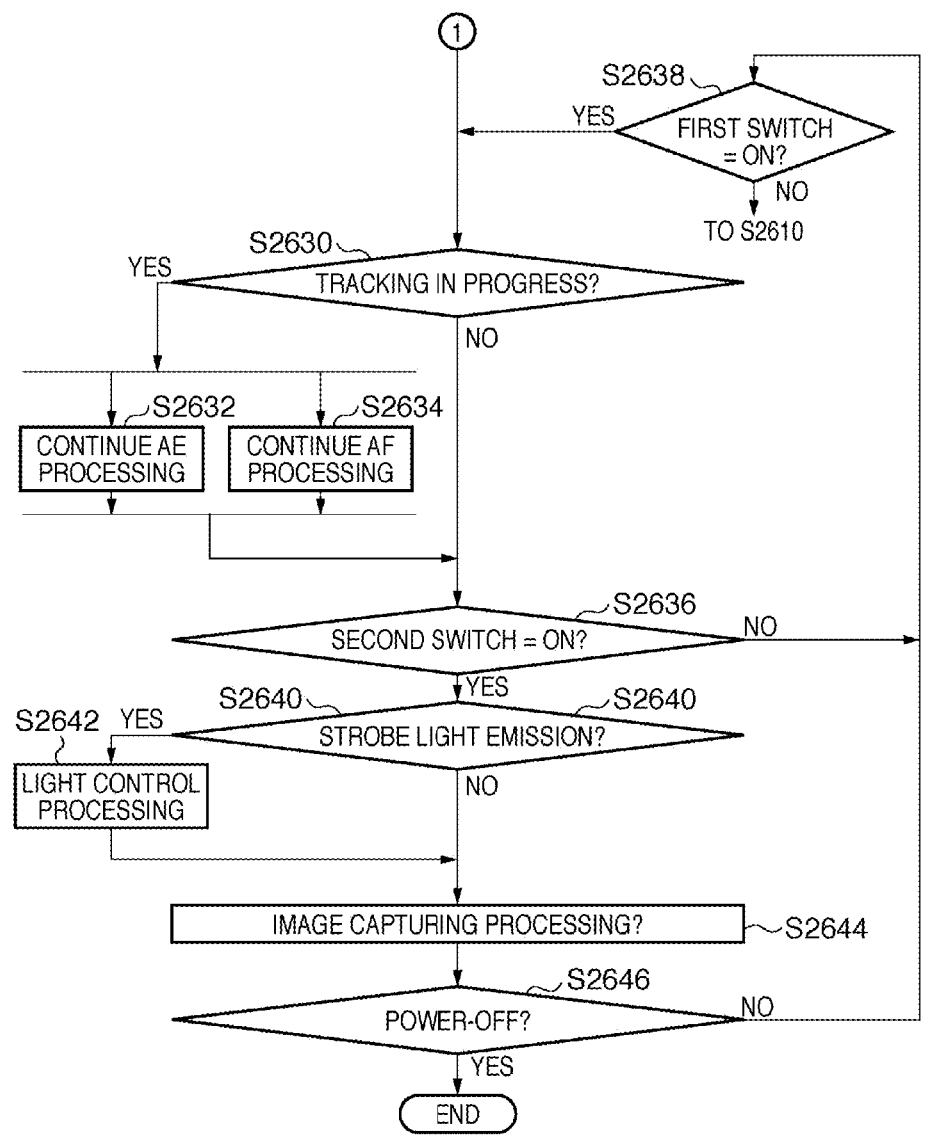

The operation of the image capturing apparatus 1 will be described below. FIGS. 26A and 26B are flowcharts for explaining the overall operation of the image capturing apparatus 1. In step S2602, when the power supply state of the image capturing apparatus 1 is switched to the power-ON state upon pressing of the power switch 146d, the system control unit 134 is activated. In step S2604, devices (the lens 102, shutter 114, stop 110, image sensing element 118, display unit 140, etc.) which configure the image capturing apparatus 1 are activated. In step S2606, the AE processing, AWB processing, and AF processing are started to obtain an appropriate exposure value, colors, and focus of an image to be displayed on the display unit 140. In step S2608, the display unit 140 begins to display an image.

It is determined in step S2610 whether or not a target object to be tracked is designated. The target object to be tracked can be designated when the user operates the tracking target designation frame superimposed on an image displayed on the display unit 140 or directly presses an image displayed on the display unit 140 (see FIG. 2A), as described above. If the target object to be tracked is designated, the process advances to step S2612 to execute feature color extraction processing for extracting feature colors of the target object. If no target object to be tracked is designated, the process advances to steps S2614, S2616, S2618, and S2620.

In steps S2614, S2616, and S2618, the AE processing, AWB processing, and AF processing are continued to obtain an appropriate exposure value, colors, and focus of an image to be displayed on the display unit 140. It is determined in step S2620 whether or not a target object is to be tracked. If a target object is to be tracked, the process advances to step S2622 to execute tracking processing for tracking a target object. If a target object is not to be tracked, the process advances to step S2624.

It is determined in step S2624 whether or not the first switch is ON upon operation of the release button 146*d*. If the first switch is not ON, the process returns to step S2610. If the first switch is ON, the process advances to step S2626.

In step S2626, the AE processing is executed to obtain an appropriate exposure value of an image to be captured. In step S2628, the AF processing is executed to obtain an appropriate focus of an image to be captured. Note that when the tracking processing is executed, the AE processing and AF processing are executed using the result of the tracking processing.

It is determined in step S2630 whether or not the tracking operation of the target object is in progress. If the tracking operation of the target object is in progress, the process advances to steps S2632 and S2634. If the tracking operation of the target object is not in progress, the process advances to step S2636.

In step S2632, the AE processing is executed using the result of the tracking processing, so as to obtain an appropriate exposure value of an image to be captured. In step S2634, the AF processing is executed using the result of the tracking processing, so as to obtain an appropriate focus of an image to be captured. Note that in general, when the first switch is turned on, preparations are made to capture an image of an object, and the control waits until the second switch is turned on. However, when the tracking processing is executed, since an object is normally a moving object, it is preferable to execute the AE processing and AF processing according to the result of the tracking processing while the first switch is ON like in this embodiment.

It is determined in step S2636 whether or not the second switch is ON upon operation of the release button 146*d*. If the second switch is not ON, the process advances to step S2638. If the second switch is ON, the process advances to step S2640.

It is determined in step S2638 whether or not the first switch is ON. If the first switch is not ON, the process returns to step S2610. If the first switch is ON, the process returns to step S2630.

It is determined in step S2640 whether or not strobe light is to be emitted by the strobe unit 144. For example, in a low illuminance environment or backlight scene, it is required to emit strobe light.

If strobe light is to be emitted, the process advances to step S2642 to execute light control processing required to decide an amount of light (light-emitting amount) of the strobe light. If the strobe light is not to be emitted, the process advances to step S2644.

In step S2644, image capturing processing for capturing an image of an object is executed. In this case, when the object is irradiated with strobe light, the strobe light is emitted to have the amount of light decided in step S2642. It is determined in step S2646 whether or not the power supply state of the image capturing apparatus 1 is switched to the power-OFF state upon operation of the power switch 146*a*. If the power supply state is not switched to the power-OFF state (the power-ON state is maintained), the process returns to step S2638. If the power supply state is switched to the power-OFF state, end processing is executed, thus ending the operation.

Figure 27A:
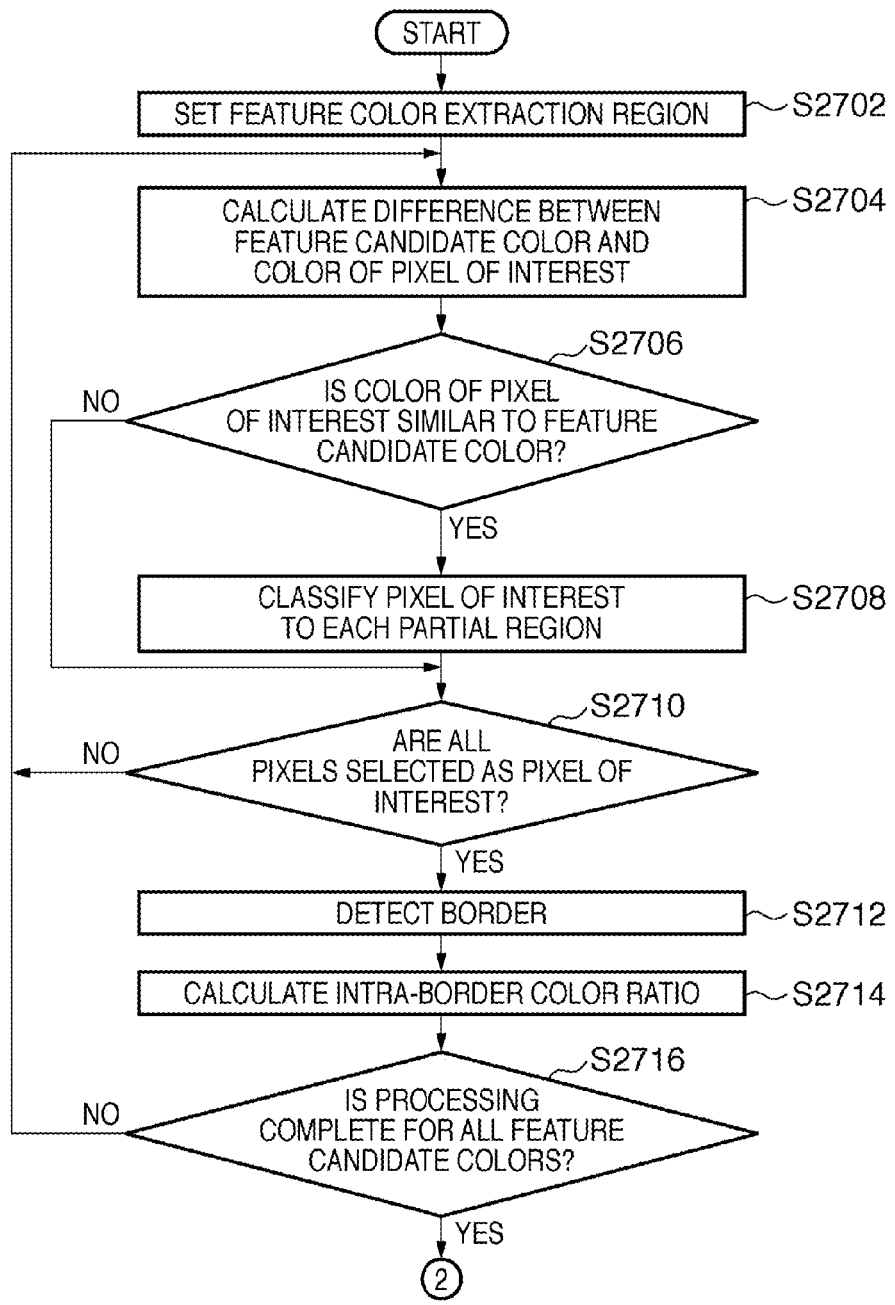
FIGS. 27A and 27B are flowcharts for explaining feature color extraction processing in step S2612 shown in FIG. 26A.
Figure 27B:
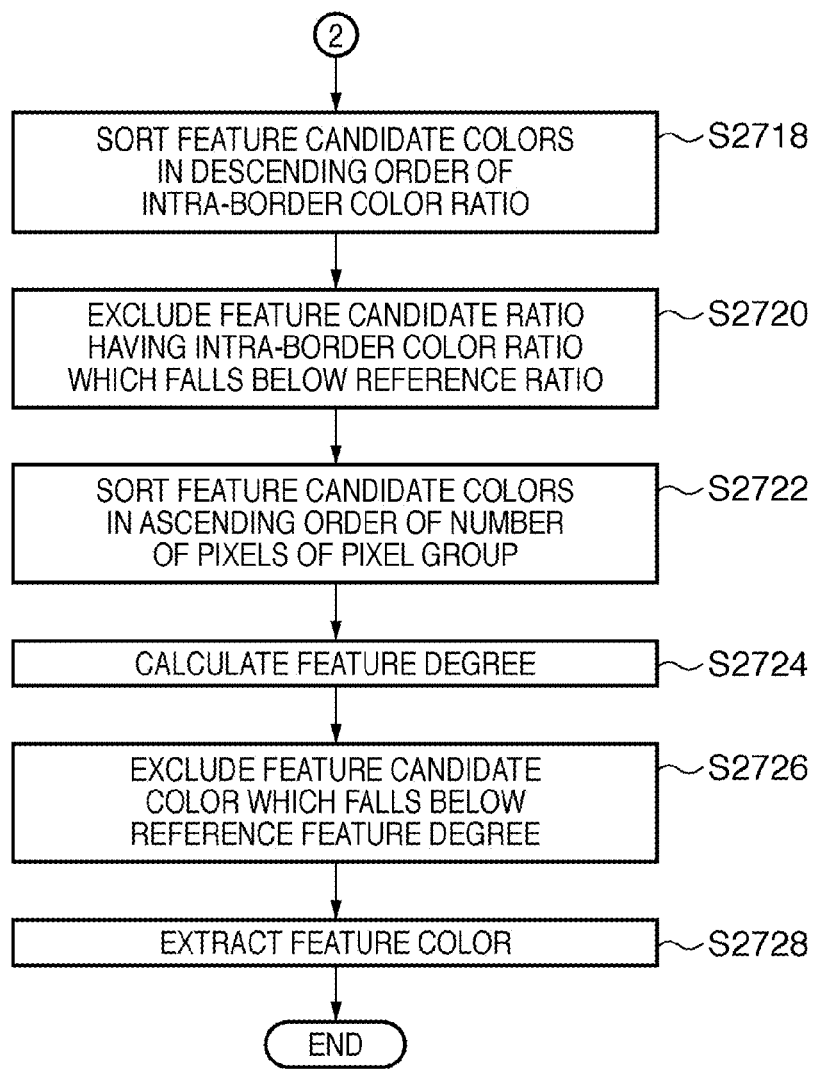

The feature color extraction processing (S2612) will be described below with reference to FIGS. 27A and 27B. In step S2702, a feature color extraction region required to extract feature colors of a target object to be tracked is set (see FIG. 2B). In step S2704, a color of each pixel included in the feature color extraction region is extracted as a feature candidate color, and a difference between the feature candidate color and a pixel of interest is calculated.

It is determined in step S2706 whether or not the color of the pixel of interest is similar to the feature candidate color. More specifically, as described above, when the difference calculated in step S2704 falls within the range of the predetermined signal level, as described above, it is determined that the color of that pixel of interest is similar to the feature candidate color. If the color of the pixel of interest is not similar to the feature candidate color, the process advances to step S2710. If the color of the pixel of interest is similar to the feature candidate color, the process advances to step S2708 to classify the pixel of interest, which is determined to be similar to the feature candidate color, to one of partial regions. Note that the partial regions are obtained by dividing an image according to distances from a base point as a pixel corresponding to the tracking target designated position, as described above.

It is determined in step S2710 whether or not all pixels are selected as a pixel of interest. If pixels to be selected as a pixel of interest still remain, the next pixel is selected as a pixel of interest, and the process returns to step S2704. If all the pixels are selected as the pixel of interest, the process advances to step S2712.

In step S2712, a pixel group in which pixels of colors similar to the feature candidate color (that is, which includes pixels of similar colors) is specified, and a border between the pixel group which includes the pixel of the feature candidate color and also pixels of similar colors to the feature candidate color, and pixels of other colors is detected.

In step S2714, an intra-border color ratio is calculated. Note that the intra-border color ratio is a ratio of the number of pixels of the pixel group of the pixel of the feature candidate color to the total number of pixels of similar pixels to that feature candidate color included in the entire image, as described above.

It is determined in step S2716 whether or not the processes in steps S2704 to S2714 have been applied to all feature candidate colors. If feature candidate colors to which the processes in steps S2704 to S2714 are to be applied still remain, the next feature candidate color is selected, and the process returns to step S2704. If the processes in steps S2704 to S2714 have been applied to all the feature candidate colors, the process advances to step S2718.

In step S2718, the feature candidate colors are sorted in descending order of intra-border color ratio calculated in step S2714. In step S2720, a feature candidate color having the intra-border color ratio which falls below a reference ratio of the feature candidate colors is excluded from candidates of feature colors of the target object. Note that the reference ratio is set to exclude a feature candidate color having a lower intra-border color ratio from candidates of feature colors of the target object, as described above.

In step S2722, the feature candidate colors are sorted in ascending order of the number of pixels of the pixel group of the pixel of the feature candidate color. In step S2724, relative feature degrees of the feature candidate colors are calculated. Note that the feature degree is a ratio of the smallest number of pixels of those of the pixel groups to the number of pixels of the pixel group of interest, as described above. In step S2726, a feature candidate color whose feature degree falls below a reference feature degree of the feature candidate colors is excluded from candidates of feature colors of the target object. Note that the reference feature degree is set to exclude a feature candidate color having a lower feature degree from candidates of feature colors of the target object, as described above.

In step S2728, the feature candidate colors, which are not excluded in steps S2720 and S2726, are extracted as candidate colors of the target object. Note that the feature candidate colors which are extracted as candidate colors of the target object are stored as static feature colors (see FIG. 13A), as described above.

Figure 28:
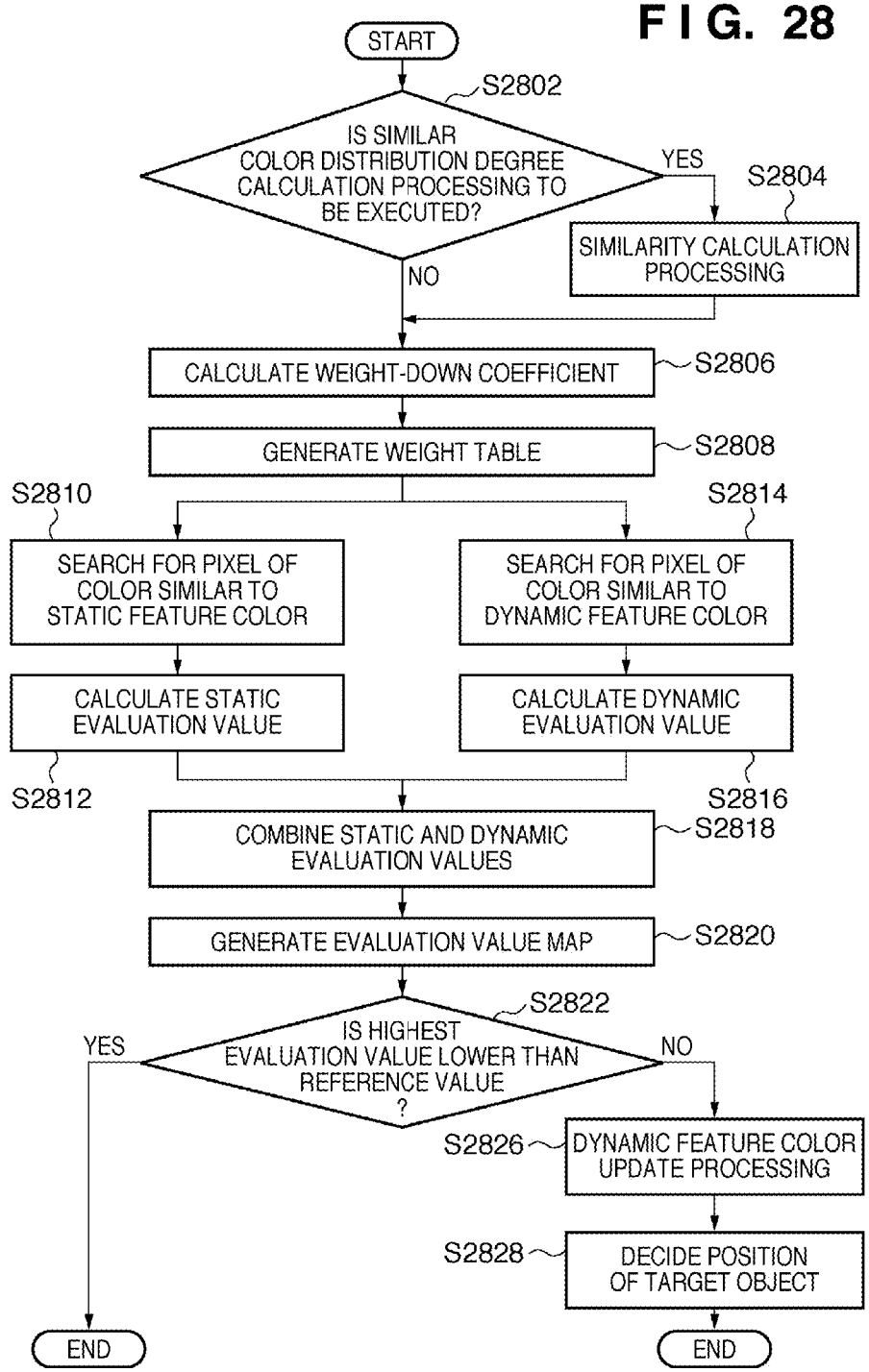
FIG. 28 is a flowchart for explaining tracking processing in step S2622 shown in FIG. 26A.

The tracking processing (S2622) will be described below with reference to FIG. 28. It is determined in step S2802 whether or not similar color distribution degree calculation processing for calculating a similar color distribution degree is to be executed. Note that the similar color distribution degree is a sum total of distances between a position of a pixel corresponding to the latest target object position and positions of pixels (similar pixels) similar to the feature colors of the target object, as described above. If the similar color distribution degree calculation processing is skipped, the process advances to step S2806. If the similar color distribution degree calculation processing is to be executed, the process advances to step S2804 to execute the similar color distribution degree calculation processing.

In step S2806, a weight-down coefficient is calculated based on the similar color distribution degree calculated in step S2804 (see FIG. 15). In step S2808, a weight table is generated based on the weight-down coefficient calculated in step S2806 (see FIG. 16).

In step S2810, a static search region is set based on the weight table generated in step S2808, and is searched for pixels of colors similar to the static feature colors of the target object (similar pixels).

In step S2812, a color similarity, which indicates a similar degree to each static feature color of the target object, and a neighboring degree are calculated, and a static evaluation value using the color similarity, neighboring degree, and feature degree is calculated for each of the similar pixels found in step S2810.

In step S2814, a dynamic search region having an area smaller than that of the static search region is set and is searched for pixels of colors similar to a dynamic feature color of the target object (similar pixels).

In step S2816, a color similarity, which indicates a similar degree to the dynamic feature color of the target object, and a neighboring degree are calculated, and a dynamic evaluation value using the color similarity, neighboring degree, and feature degree is calculated for each of the similar pixels found in step S2814.

In step S2818, the static evaluation values calculated in step S2812 and the dynamic evaluation values calculated in step S2816 are combined. More specifically, one evaluation value of the static evaluation values is replaced by a highest evaluation value of the dynamic evaluation values, as described above.

In step S2820, the evaluation values generated by combining the static and dynamic evaluation values are weighted by weight amounts of the weight table generated in step S2808, thus generating an evaluation value map.

It is determined in step S2822 whether or not the highest evaluation value is lower than a reference value in the evaluation value map generated in step S2820. If the highest evaluation value is lower than the reference value, the user is notified of a tracking failure of the target object, thus ending the tracking processing. If the highest evaluation value is equal to or higher than the reference value, the process advances to step S2826 to execute dynamic feature color update processing for updating the dynamic feature color. In step S2828, the position of the pixel having the highest evaluation value is set as a base point, and a region including pixels having high evaluation values to some extent is decided as the position of the target object.

Figure 29:
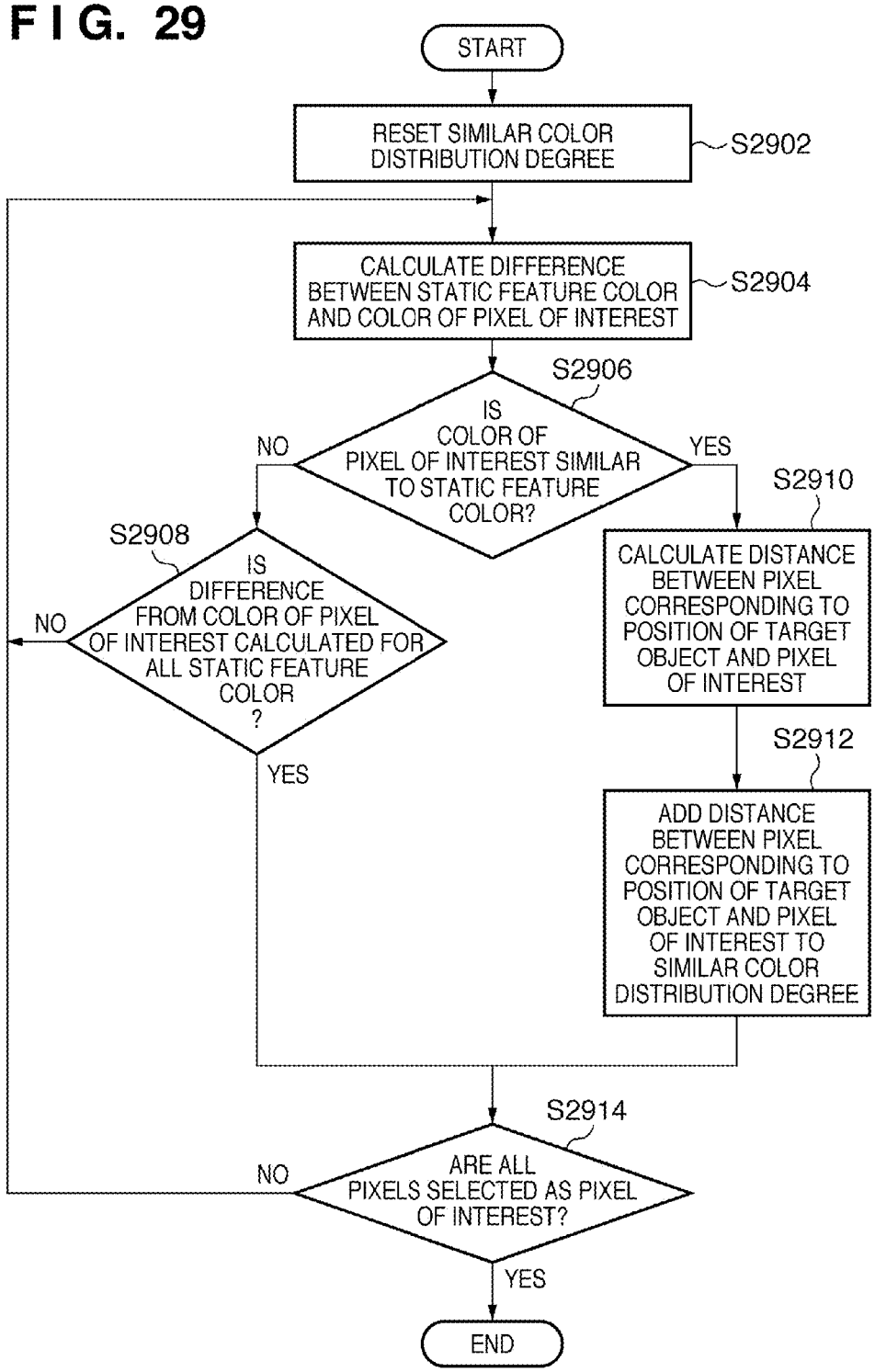
FIG. 29 is a flowchart for explaining similar color distribution degree calculation processing in step S2804 shown in FIG. 28.

The similar color distribution degree calculation processing (S2804) will be described below with reference to FIG. 29. In step S2902, a similar color distribution degree is reset to zero. In step S2904, a difference between one static feature color and a color of a pixel of interest is calculated. It is determined in step S2906 whether or not the color of the pixel of interest is similar to the static feature color. If the color of the pixel of interest is not similar to the static feature color, the process advances to step S2908. If the color of the pixel of interest is similar to the static feature color, the process advances to step S2910.

It is determined in step S2908 whether or not the difference from the color of the pixel of interest has been calculated (that is, the process in step S2904 is complete) for all the static feature colors. If static feature colors for which the difference from the color of the pixel of interest is to be calculated still remain, the next static feature color is selected, and the process returns to step S2904. If the difference from the color of the pixel of interest has been calculated for all the static feature colors, the process advances to step S2914.

In step S2910, a distance between a pixel corresponding to the latest target object position and the pixel of interest, which is determined in step S2906 to be similar to the static feature color, is calculated. In step S2912, the distance calculated in step S2910 is added to the similar color distribution degree.

It is determined in step S2914 whether or not all pixels are selected as a pixel of interest. If pixels to be selected as a pixel of interest still remain, the next pixel is selected as a pixel of interest, and the process returns to step S2904. If all the pixels are selected as a pixel of interest, the similar color distribution degree calculation processing ends.

Figure 30B:
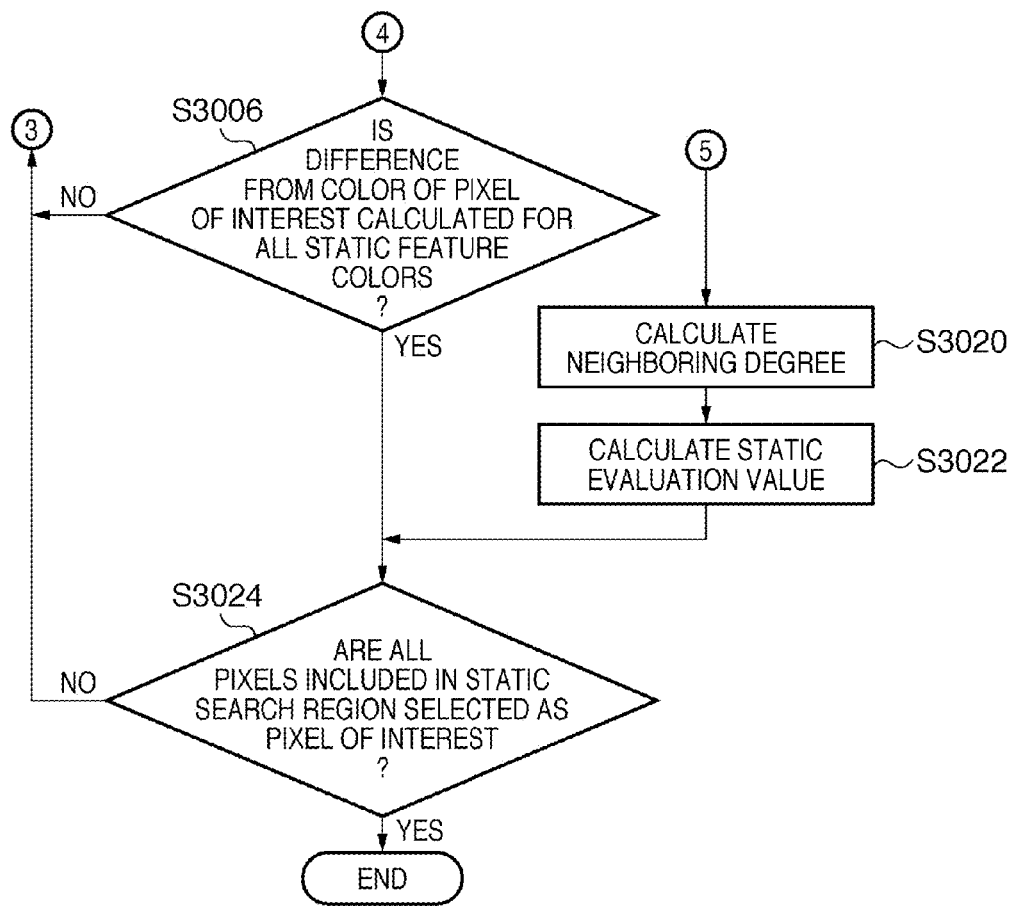

The static evaluation value calculation processing (S2812) will be described below with reference to FIGS. 30A and 30B. Note that the dynamic evaluation value calculation processing (S2816) is the same as the static evaluation value calculation processing, and a description thereof will not be given.

In step S3002, a difference between one static feature color and a color of a pixel of interest is calculated. It is determined in step S3004 whether or not the color of the pixel of interest is similar to the static feature color. If the color of the pixel of interest is not similar to the static feature color, the process advances to step S3006. If the color of the pixel of interest is similar to the static feature color, the process advances to step S3008.

It is determined in step S3006 whether or not the difference from the color of the pixel of interest has been calculated (that is, the process in step S3002 is complete) for all the static feature colors. If the static feature colors for which the difference from the color of the pixel of interest is to be calculated still remain, the next static feature color is selected, and the process returns to step S3002. On the other hand, if the difference from the color of the pixel of interest has been calculated for all the static feature colors, the process advances to step S3024.

In step S3008, a color similarity, which represents a similar degree with the static feature color of the target object, is calculated for the pixel of interest, which is determined in step S3004 to be similar to the static feature color. In step S3010, a counter used to count the number of pixels is reset to zero.

In step S3012, differences between colors of pixels (neighboring pixels) which neighbor the upper, lower, right, and left positions of the pixel of interest, which is determined in step S3004 to be similar to the static feature color, and colors of sub pixels are calculated. It is determined in step S3014 whether or not the colors of the neighboring pixels of the pixel of interest, which is determined in step S3004 to be similar to the static feature color, are similar to the colors of the sub pixels. If the colors of the neighboring pixels are not similar to the colors of the sub pixels, the process advances to step S3018.

If the colors of the neighboring pixels are similar to the colors of the sub pixels, the process advances to step S3016.

In step S3016, the number of pixels, which are determined in step S3014 to be similar to the colors of the sub pixels, is counted, and is added to the counter.

It is determined in step S3018 whether or not differences from the colors of the sub pixels have been calculated (that is, the process in step S3012 is complete) for all the pixels of interest, which are determined in step S3004 to be similar to the static feature color. If the pixels of interest, which are determined to be similar to the static feature color and for which the differences from the colors of the sub pixels are to be calculated, still remain, the next pixel of interest is selected, and the process returns to step S3012. If the differences from the colors of the sub pixels have been calculated for all the pixels of interest, which are determined to be similar to the static feature color, the process advances to step S3020.

In step S3020, a neighboring degree is calculated based on the count result of the number of pixels, which are determined to be similar to the colors of the sub pixels. In step S3022, a static evaluation value is calculated using the color similarity, neighboring degree, and feature degree.

It is determined in step S3024 whether or not all pixels included in the static search region are selected as a pixel of interest. If pixels which are included in the static search region and are to be selected as a pixel of interest still remain, the next pixel is selected as a pixel of interest, and the process returns to step S3002. If all the pixels included in the static search region are selected as a pixel of interest, the static evaluation value calculation processing ends.

Figure 31:
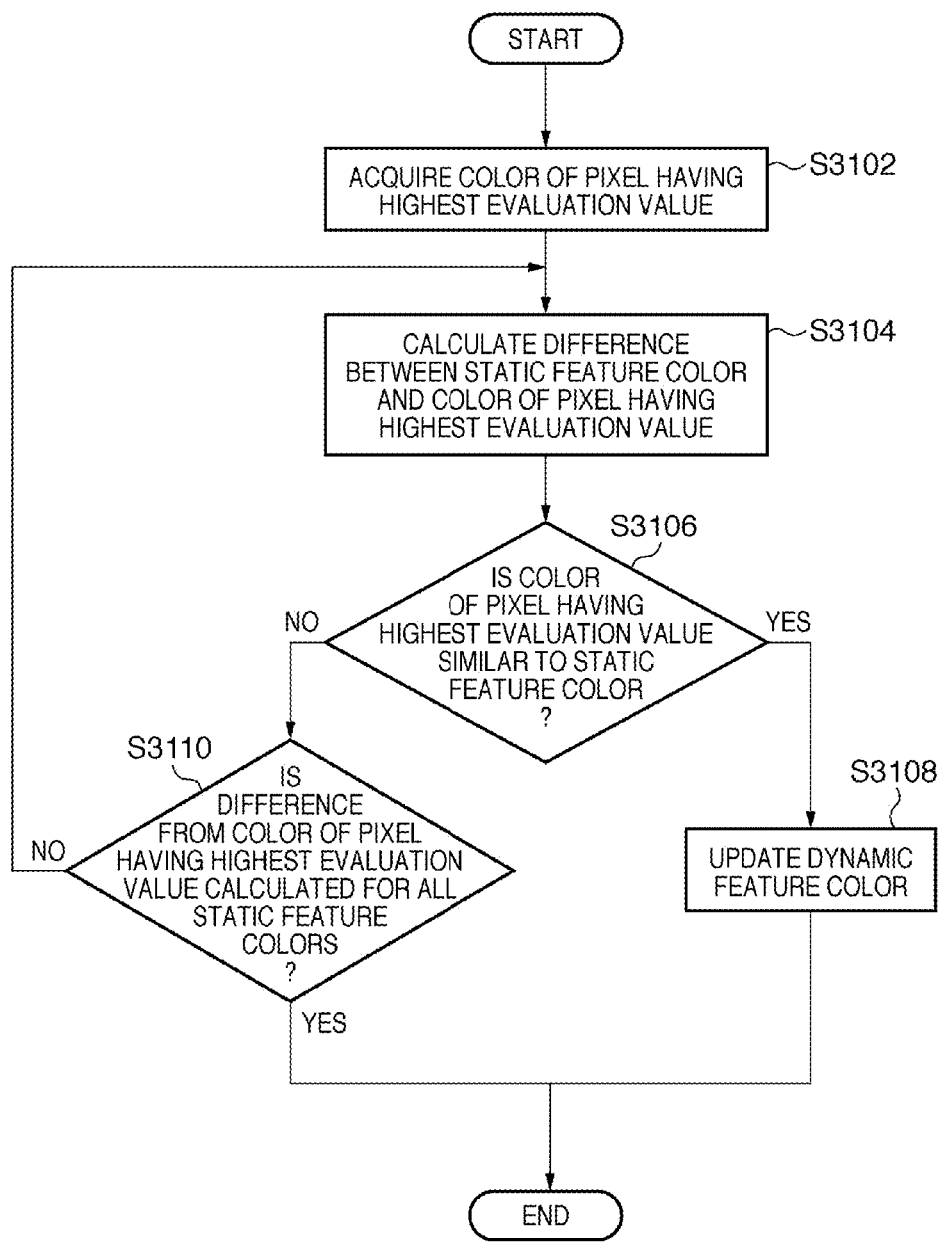
FIG. 31 is a flowchart for explaining dynamic feature color update processing in step S2826 shown in FIG. 28.

The dynamic feature color update processing (S2826) will be described below with reference to FIG. 31. In step S3102, a color (R, G, and B components) of a pixel having the highest evaluation value is acquired from the evaluation value map generated in step S2820. In step S3104, a difference between one static feature color and the color of the pixel having the highest evaluation value, which is acquired in step S3102, is calculated. It is determined in step S3106 whether or not the color of the pixel having the highest evaluation value is similar to the static feature color. If the color of the pixel having the highest evaluation value is similar to the static feature color, the process advances to step S3108 to store the color of the pixel having the highest evaluation value as a new dynamic feature color (to update the dynamic feature color). If the color of the pixel having the highest evaluation value is not similar to the static feature color, the process advances to step S3110.

It is determined in step S3110 whether or not the difference from the color of the pixel having the highest evaluation value has been calculated (that is, the process in step S3104 is complete) for all the static feature colors. If static feature colors for which the difference from the color of the pixel having the highest evaluation value is to be calculated still remain, the next static feature color is selected, and the process returns to step S3104. If the difference from the color of the pixel having the highest evaluation value has been calculated for all the static feature colors, the dynamic feature color update processing ends.

Note that in this embodiment, the weight-down coefficient is decided according to the similar color distribution degree to generate the weight table so as to eliminate occurrence of a tracking error when there are many similar pixels around the target object to be tracked (see FIGS. 14 and 15). However, a target object OB to be tracked may recede from the front side to the back side of the display unit 140, as shown in FIG. 32A. In such case, it is predicted that the evaluation value (see equation (10)) gradually becomes smaller with increasing distance from the target object OB. For example, as for a color similarity, when an image is divided into blocks, since the size of the target object OB to be tracked becomes smaller, the colors of the target object OB may mix with a background color in one block, thus lowering the color similarity. Also, as for a neighboring degree, when a neighboring relationship using a body of a dog as the target object OB is stored, it can no longer be maintained as the size of the body of the dog becomes smaller, thus lowering the neighboring degree. In this manner, when the evaluation value becomes lower, if a pixel of a color similar to a feature color of the target object OB exists, that pixel is more likely to be tracked (that is, a tracking error is more likely to occur). In such case, as shown in FIG. 33, a weight-down coefficient can be decided according to the evaluation value. FIG. 33 adopts evaluation values on the abscissa, and weight-down coefficients on the ordinate. As can be seen from FIG. 33, the weight-down coefficient becomes larger with decreasing evaluation value. Thus, a change amount of the weight amounts becomes steeper with decreasing evaluation value, and a weight table including small circumferential weight amounts is generated. Therefore, as shown in FIG. 32B, a broad static search region SSA is set when the target object OB is located on the front side, and a narrower static search region SSA is set when the target object OB is located on the back side, thus eliminating occurrence of a tracking error.

Figure 34A:
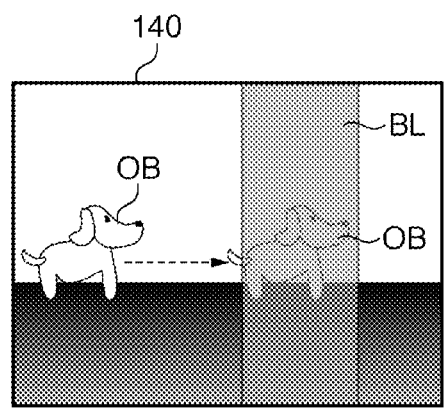
FIGS. 34A and 34B are views showing an example of a static search region set according to a motion of a target object.
Figure 34B:
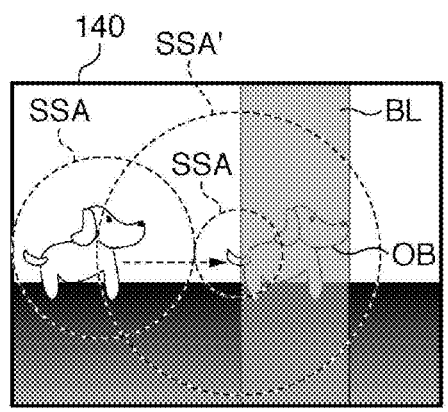
Figure 35:
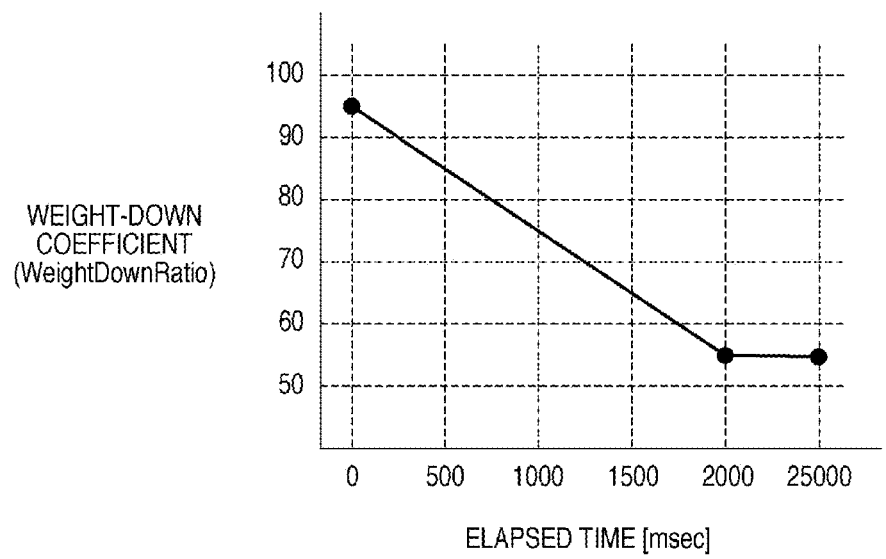
FIG. 35 is a graph showing a weight-down coefficient according to an elapsed time after a target object is lost.

As shown in FIG. 34A, the target object OB to be tracked may move to a position behind a blind BL, and may be lost (a tracking failure may occur). In this case, when a pixel of a color similar to the feature color of the target object OB exists immediately after the target object OB is lost, that pixel is more likely to be tracked (that is, a tracking error is more likely to occur). Hence, according to an elapsed time since the target object OB is lost (since a tracking failure), the weight-down coefficient is decided so that a larger weight-down coefficient is set as the elapsed time is shorter. Thus, as shown in FIG. 34B, the static search region SSA is narrowed down immediately after the target object OB is lost, thus eliminating occurrence of a tracking error. When the target object OB returns to a lost position, tracking of the target object OB can be restarted. However, there is no guarantee that the target object OB returns to the lost position. For example, the target object OB may appear at another position after it has pass through the blind BL. Hence, although there is a risk of a tracking error, the static search region SSA is gradually broadened to have the lost position of the target object OB as the center, as indicated by a region SSA' in FIG. 34B, thus coping with a case in which the target object OB appears at a position which has passed through the blind BL. More specifically, the weight-down coefficient can be decided, as shown in FIG. 35. FIG. 35 adopts the elapsed times on the abscissa, and the weight-down coefficients on the ordinate. As can be seen from FIG. 35, a larger weight-down coefficient is set as an elapsed time becomes shorter. As a result, immediately after the target object OB is lost, a large weight-down coefficient is set, and a change amount of the weight amounts becomes steeper, thus generating a weight table including smaller circumferential weight amounts. Then, the weight-down coefficient becomes gradually smaller according to the elapsed time since the target object OB is lost, thus generating a weight table in which the change amount of the weight amounts is moderate.

Note that when the tracking operation of the target object OB can be restarted, the weight-down coefficient is decided according to the similar color distribution degree in place of the elapsed time since the target object OB is lost. When the tracking operation of the target object OB cannot be restarted, it is aborted, and the user is notified of that fact.

The user can select as needed how to decide the weight-down coefficient, that is, whether or not to decide the weight-down coefficient according to the similar color distribution degree, evaluation value, or elapsed time. Also, a largest weight-down coefficient of those decided based on them may be selected.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2010-183481 filed on Aug. 18, 2010, which is hereby incorporated by reference herein in its entirety.

What is claimed is:

1. A tracking apparatus for tracking a target object designated on an image which is captured by an image sensing element having a plurality of pixels, comprising:
   a setting unit configured to set a pixel region including a pixel corresponding to a position of the designated target object as a feature color extraction region used to extract a feature color of the target object, and to set colors of respective pixels included in the feature color extraction region as feature candidate colors;
   a calculation unit configured to calculate, for each of the feature candidate colors, a first area of a pixel group which includes a pixel of a feature candidate color of interest and in which pixels of colors similar to the feature candidate color of interest continuously appear, a second area of pixels of colors similar to the feature candidate color of interest in the plurality of pixels, and a ratio of the first area to the second area;
   an extraction unit configured to extract a feature candidate color having the smallest first area as a feature color of the target object from feature candidate colors for each of which the ratio of the first area to the second area is higher than a predetermined reference ratio; and
   a decision unit configured to decide, as the target object, a position corresponding to a pixel of a color similar to the feature color extracted by the extraction unit.

2. The apparatus according to claim 1, wherein the calculation unit calculates a ratio of the first area of the extracted feature color to the first area of a feature candidate color of interest as a feature degree for each of the feature candidate colors, and
   the extraction unit extracts a feature candidate color having the feature degree higher than a predetermined reference feature degree of the feature candidate colors as a feature color of the target object.

3. The apparatus according to claim 1, wherein the calculation unit calculates a feature candidate color for which the ratio of the first area to the second area is higher than the predetermined reference ratio from feature candidate colors each having the first area smaller than a reference area.

4. The apparatus according to claim 2, wherein the reference feature degree is set to extract a feature candidate color having the higher feature degree as a feature color of the target object.

5. The apparatus according to claim 2, wherein the decision unit selects a feature color in descending order of the feature degree of the feature colors extracted by the extraction unit, and decides a position corresponding to a pixel of a color similar to the selected feature color as the target object.

6. The apparatus according to claim 1, wherein the reference ratio is set to extract a feature candidate color having the higher ratio of the first area to the second area as a feature color of the target object.

7. The apparatus according to claim 1, wherein when the pixel group includes end pixels in the plurality of pixels, the extraction unit excludes a feature candidate color corresponding to that pixel group from feature colors of the target object.

8. The apparatus according to claim 1, further comprising:
   a first storage unit configured to store the feature color extracted by the extraction unit as a static feature color of the target object;
   a second storage unit configured to store a color of a pixel corresponding to the position of the target object decided by the decision unit as a dynamic feature color of the target object; and
   a region setting unit configured to set a first region used to track the target object using the static feature color stored in the first storage unit, and a second region which has an area smaller than an area of the first region and is used to track the target object using the dynamic feature color stored in the second storage unit in the plurality of pixels,
   wherein the decision unit calculates a first similarity indicating a similar degree of a color of a pixel of interest to the static feature color for each of pixels included in the first region, and a second similarity indicating a similar degree of a color of a pixel of interest to the dynamic feature color for each of pixels included in the second region, and
   the decision unit decides a position corresponding to a pixel, for which a similarity obtained by combining the first similarity and the second similarity is highest, and satisfies a predetermined reference similarity, as the target object.

9. The apparatus according to claim 8, wherein a criterion of the similarity upon calculation of the second similarity is higher than a criterion of the similarity upon calculation of the first similarity.

10. The apparatus according to claim 8, wherein the region setting unit sets a third region having an area larger than the area of the first area in the plurality of pixels, and
the decision unit calculates a distribution degree of pixels of colors similar to the static feature color of the target object in the third region to set the criterion according to the distribution degree, and sets the higher criterion as the distribution degree is higher.

11. The apparatus according to claim 10, wherein the decision unit sets the criterion of the similarity upon calculation of the first similarity to be constant and sets the higher criterion of the similarity upon calculation of the second similarity as the distribution degree is higher.

12. The apparatus according to claim 8, wherein when a difference between the color of the pixel corresponding to the position of the target object decided by the decision unit and the static feature color is less than a threshold, the second storage unit stores the color of the pixel corresponding to the position of the target object as a new dynamic feature color.

13. The apparatus according to claim 8, further comprising:
a generation unit configured to set the pixel corresponding to the position decided as the target object by the decision unit as a base point, and to generate a weight table in which larger weight amounts are set with increasing distance from the base point,
wherein the decision unit gives the weight amounts set in the weight table generated by the generation unit to the first similarities and the second similarities, and decides, as the target object, a position corresponding to a pixel for which a similarity obtained by combining the first similarity weighted by the weight amount and the second similarity weighted by the weight amount is highest, and satisfies the reference similarity.

14. The apparatus according to claim 13, wherein the region setting unit sets a third region having an area larger than the area of the first region in the plurality of pixels,
the decision unit calculates a distribution degree of pixels of colors similar to the static feature color of the target object in the third region, and
the generation unit generates a weight table in which the weight amounts are set to have a steeper change amount of the weight amounts according to distances from the base point as the distribution degree is higher.

15. The apparatus according to claim 14, wherein an operation cycle for calculating the distribution degree is longer than an operation cycle for deciding, as the target object, a position corresponding to a pixel for which a similarity obtained by combining the first similarity and the second similarity is highest, and satisfies the reference similarity.

16. The apparatus according to claim 13 wherein the generation unit generates a weight table in which the weight amounts are set to have a steeper change amount of the weight amounts according to distances from the base point as the similarity of the pixel corresponding to the position decided as the target object by the decision unit is lower.

17. The apparatus according to claim 13, wherein the decision unit determines whether or not a similarity of the pixel, for which the similarity obtained by combining the first similarity weighted by the weight amount and the second similarity weighted by the weight amount is highest, satisfies the reference similarity, and decides that a tracking failure of the target object occurs when the similarity of the pixel having the highest similarity does not satisfy the reference similarity, and
the generation unit generates a weight table in which the weight amounts are set to have a steeper change amount of the weight amounts according to distances from the base point as an elapsed time since the tracking failure of the target object is shorter.

18. A tracking method for tracking a target object designated on an image which is captured by an image sensing element having a plurality of pixels, comprising:
a setting step of controlling a setting unit to set a pixel region including a pixel corresponding to a position of the designated target object as a feature color extraction region used to extract a feature color of the target object, and to set colors of respective pixels included in the feature color extraction region as feature candidate colors;
a calculation step of controlling a calculation unit to calculate, for each of the feature candidate colors, a first area of a pixel group which includes a pixel of a feature candidate color of interest and in which pixels of colors similar to the feature candidate color of interest continuously appear, a second area of pixels of colors similar to the feature candidate color of interest in the plurality of pixels, and a ratio of the first area to the second area;
an extraction step of controlling an extraction unit to extract a feature candidate color having the smallest first area as a feature color of the target object from feature candidate colors for each of which the ratio of the first area to the second area is higher than a predetermined reference ratio; and
a decision step of controlling a decision unit to decide, as the target object, a position corresponding to a pixel of a color similar to the feature color extracted by the extraction unit.

19. A non-transitory computer-readable storage medium storing a program for controlling a computer to execute a tracking method for tracking a target object designated on an image which is captured by an image sensing element having a plurality of pixels, the program controlling the computer to execute:
a setting step of setting a pixel region including a pixel corresponding to a position of the designated target object as a feature color extraction region used to extract a feature color of the target object, and setting colors of respective pixels included in the feature color extraction region as feature candidate colors;
a calculation step of calculating, for each of the feature candidate colors, a first area of a pixel group which includes a pixel of a feature candidate color of interest and in which pixels of colors similar to the feature candidate color of interest continuously appear, a second area of pixels of colors similar to the feature candidate color of interest in the plurality of pixels, and a ratio of the first area to the second area;
an extraction step of extracting a feature candidate color having the smallest first area as a feature color of the target object from feature candidate colors for each of which the ratio of the first area to the second area is higher than a predetermined reference ratio; and
a decision step of deciding, as the target object, a position corresponding to a pixel of a color similar to the feature color extracted in the extraction step.

* * * * *